(12) United States Patent
Collins

(10) Patent No.: US 6,842,655 B1
(45) Date of Patent: Jan. 11, 2005

(54) METHOD AND APPARATUS FOR PROCESSING AN OBJECT

(76) Inventor: Donald W. Collins, 1045 E. Sandpiper Dr., Tempe, AZ (US) 85283

( * ) Notice: Subject to any disclaimer, the term of this patent is extended or adjusted under 35 U.S.C. 154(b) by 951 days.

(21) Appl. No.: 09/657,208

(22) Filed: Sep. 7, 2000

(51) Int. Cl.$^7$ .............................................. G06F 19/00
(52) U.S. Cl. ..................................... 700/101; 700/100
(58) Field of Search ............................. 700/115, 116, 700/99–102

(56) References Cited

U.S. PATENT DOCUMENTS

| | | | | |
|---|---|---|---|---|
| 5,446,761 A | * | 8/1995 | Nag et al. | 375/317 |
| 6,246,919 B1 | * | 6/2001 | Hassel | 700/116 |
| 6,353,769 B1 | * | 3/2002 | Lin | 700/101 |
| 6,418,352 B1 | * | 7/2002 | Ellis et al. | 700/116 |
| 6,535,777 B1 | * | 3/2003 | Kohler | 700/112 |
| 6,606,530 B1 | * | 8/2003 | Brouwers | 700/101 |
| 6,647,307 B1 | * | 11/2003 | Huang et al. | 700/102 |

* cited by examiner

Primary Examiner—Leo Picard
Assistant Examiner—Ryan Jarrett
(74) Attorney, Agent, or Firm—Tod R. Nissle, P.C.

(57) ABSTRACT

A system for processing a product includes a sequence of process steps, at least one machine in each of the process steps, and a plurality of lots in the queue of the first machine. Each lot includes at least one unit of the product, a memory, and a first transmitter-receiver operatively associated with the memory. The memory identifies at least one of a pair including the lot, a unit of product. The system also includes a second transmitter-receiver device and a control operatively associated the second transmitter receiver device and the first machine to generate signals causing the second transmitter-receiver device to communicate with the first transmitter-receiver device and the memory in each of the lots to provide the memory with the time required for the first machine to process the lot.

2 Claims, 4 Drawing Sheets

---

47
MAKING A FIRST DETERMINATION BY DETERMINING WHETHER THE PRESENT QUEUE SIZE FOR THE NEXT SUBSEQUENT PROCESS STEP IS ONE OF A PAIR CONSISTING OF (1) GREATER THAN THE HISTORICAL AVERAGE QUEUE SIZE AND (2) LESS THAN THE HISTORICAL AVERAGE QUEUE SIZE

48
MAKING A SECOND DETERMINATION BY DETERMINING WHETHER THE PRESENT QUEUE SIZE FOR THE CURRENT PROCESS STEP IS ONE OF A PAIR CONSISTING OF (1) GREATER THAN THE HISTORICAL AVERAGE QUEUE SIZE AND (2) LESS THAN THE HISTORICAL AVERAGE QUEUE SIZE

49
COMPARING FOR EACH LOT THE FIRST DETERMINATION WITH THE SECOND DETERMINATION TO PRIORITIZE WHICH LOT IS SELECTED FOR PROCESSING DURING THE PRESENT PROCESS STEP.

METHOD AND APPARATUS FOR PROCESSING AN OBJECT

This invention relates to a system for processing an object.

More particularly, the invention relates to a processing system that includes multiple process steps, which includes multiple machines, and which utilizes at least one of the machines in more than one process step.

In another respect, the invention relates to a processing system of the type described that processes simultaneously more than one product.

In a further respect, the invention relates to a processing system of the type described which evaluates the queues of upcoming machines in order to determine which lot in the queue of a machine will be selected and processed first.

Manufacturing systems that utilize a plurality of machines to process a device or other object are well known. Such systems often utilize the same machine in more than one process step. When the same machine is utilized in more than one process step, backlogs of devices can accumulate waiting to be processed by the machine. The buildup of such backlogs is exacerbated when the machine breaks down or is being maintenanced. Such backlogs interfere with the timely passage of a device through all the steps in a manufacturing process and can significantly increase the cost of processing the device. This is especially the case in systems that utilize many machines and require many process steps. The dynamics and management of such multi-machine, multi-process step system is typically complicated and difficult.

Accordingly, it would be highly desirable to provide an improved method and apparatus for managing the passage of a device or object through a manufacturing system that includes many process steps, that includes multiple machines, and that uses machines that are used in more than one process step.

Therefore, it is an object of the invention to provide an improved method and apparatus for controlling the travel of a device or object through multiple process steps in a manufacturing system.

Another object of the invention is to provide an improved method and apparatus for streamlining the processing of a device by comparing the queue sizes of upcoming process steps with the queue size of the process step which a device is currently undergoing.

A further object of the invention is to provide an improved method and apparatus for facilitating the processing of a device by providing and continuously monitoring both a history of prior steps completed during the processing of the device and a listing of the upcoming steps required to complete the processing of the device.

These and other, further and more specific objects and advantages of the invention will be apparent to those skilled in art from the following detailed description thereof, taken in conjunction with the drawings, in which.

Figure 1:
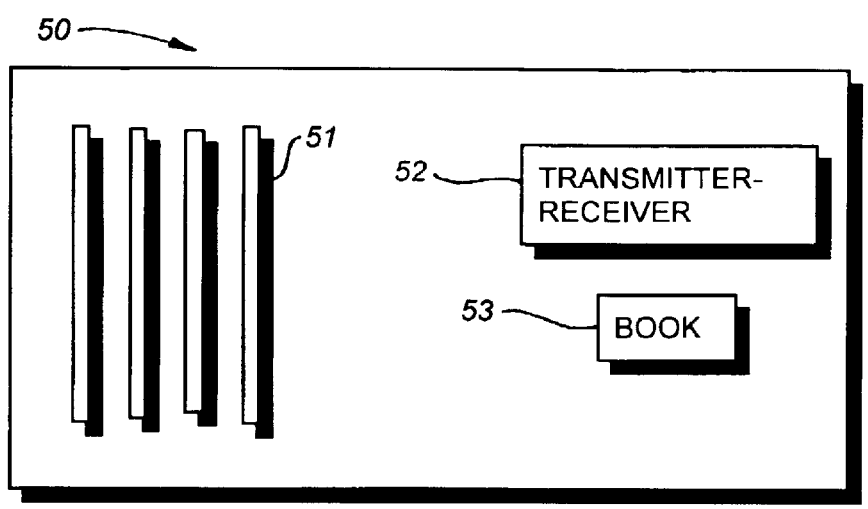
FIG. 1 is a diagram illustrating a boat constructed in accordance with the invention.

Briefly, in accordance with my invention, I provide an improved process for processing at least one product. The process processes a plurality of lots of the product and comprises a sequence of process steps including a first process step; a queue for the process step; a plurality of lots of the product in the queue; and, a machine used in the first process step to process the product. The process can also, if desired, include at least a second process step during which the machine is used to process the product. The improved process increases the efficiency of processing the product and reduces the time required for the product to complete the process. The improved process includes the steps of determining the lots of the product in the queue of the first process step; of determining for each lot in the queue of the first process step the process step which was completed immediately prior to the lot entering the queue of the first process step; and, of determining for each lot in the queue of the first process step at least the next subsequent process step to be completed by the lot after the lot is processed during the first process step, the present queue size for the next subsequent process step, and the historical average queue size for the next subsequent process step. The improved process also includes the steps of determining for the first process step the present queue size, and the historical average queue size; of making a first determination by determining whether the present queue size for the next subsequent process step is one of a pair consisting of greater than the historical average queue size for the next subsequent process step, and less than the historical average queue size for the next subsequent process step; and, making a second determination by determining whether the present queue size for the first process step is one of a pair consisting of greater than the historical average queue size of the first process step, and less than the historical average queue size of the first process step. Finally, the improved process includes the step of comparing for each lot the first determination with the second determination to prioritize which lot is selected for processing during the first process step.

In another embodiment of the invention, I provide an improved system for processing at least one product. The improved system includes a sequence of process steps; at least a first machine in each of the process steps; and, a plurality of lots in the queue of the first machine. Each lot includes at least one unit of the product, a memory, and a first transmitter-receiver device operatively associated with the memory. The memory includes data identifying at least one of a pair including the lot, and a unit of product, and includes data identifying each of the process steps of that product. The improved system also includes a second transmitter-receiver device; a controller operatively associated with the second transmitter-receiver device and the first machine to generate signals causing the second transmitter-receiver device to communicate with the first transmitter-receiver device and the memory in each of the lots to determine the previous process step completed by the lot, to confirm that the next process step for the lot requires the first machine, and to generate information used by the first machine to process that product. If desired, the controller can cause the second transmitter-receiver device to communicate to the first transmitter-receiver device and memory the time required for the first machine to process the lot.

Turning now to the drawings, which depict the presently preferred embodiments of the invention for the purpose of illustrating the practice thereof, and not by way of limitation of the scope of the invention, and in which like reference characters refer to corresponding elements throughout the several views, FIG. 1 illustrates a boat 50 carrying wafers 51, a transmitter-receiver 52, and a book 53. The wafers 51 are processed by various machines. The transmitter/receiver 52 presently sends airborne RF signals but can send or transmit microwave, fiber optic, or any other desired signals. Transmitter/receiver 52 can send signals by contacting or passing in the proximity of another transmitter/receiver or of other signal receiving means connected to a transmitter/receiver. The boat 50, wafers 51, transmitter-receiver 52, and book 53 comprise a lot.

Figure 2:
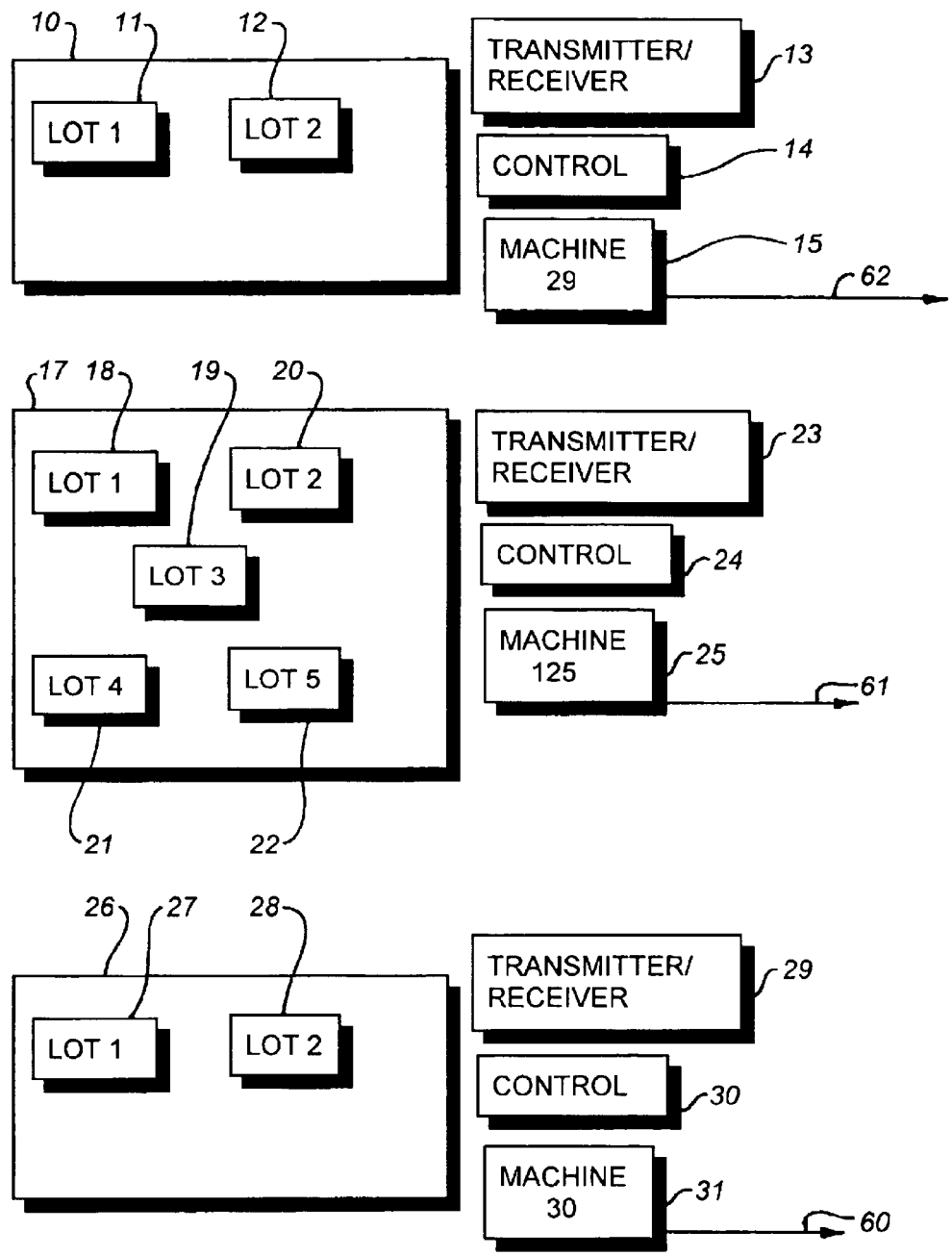
FIG. 2 is a diagram illustrating lots in the queues of processing machines.

FIG. 2 illustrates lots 11 and 12 in the queue 10 of machine 29 ready for processing by machine 29. Machine 15 includes a control 14 and transmitter/receiver 13. Lots 18 to 22 are in the queue 17 of Machine 25 and are ready for processing. Machine 25 includes a control 24 and transmitter/receiver 23. Lots 27 and 28 are in the queue 26 of machine 31 and are ready for processing. Machine 31 includes control 30 and transmitter/receiver 29.

After a lot 11, 12 is processed by machine 15, the lot is sent 62 to the next machine.

After a lot 18 to 22 is processed by machine 25, the lot is sent 61 to the next machine.

After a lot 27, 28 is processed by machine 31, the lot is sent 60 to the next machine.

Figure 3:
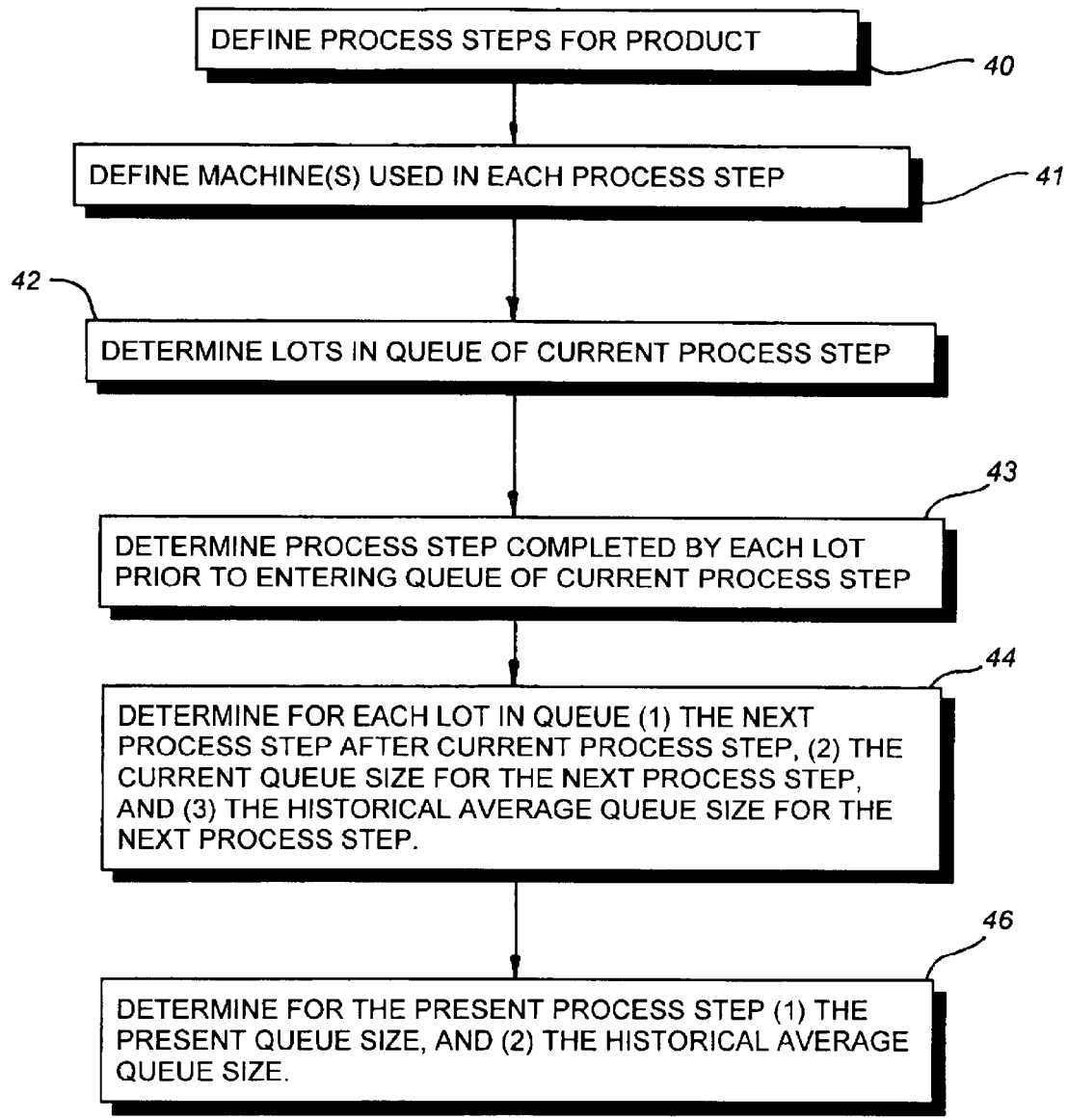
FIG. 3 is a block flow diagram illustrating a processing method in accordance with the invention; and, FIG. 4 is a block flow diagram illustrating the steps for completing the processing method of FIG. 3.
Figure 4:
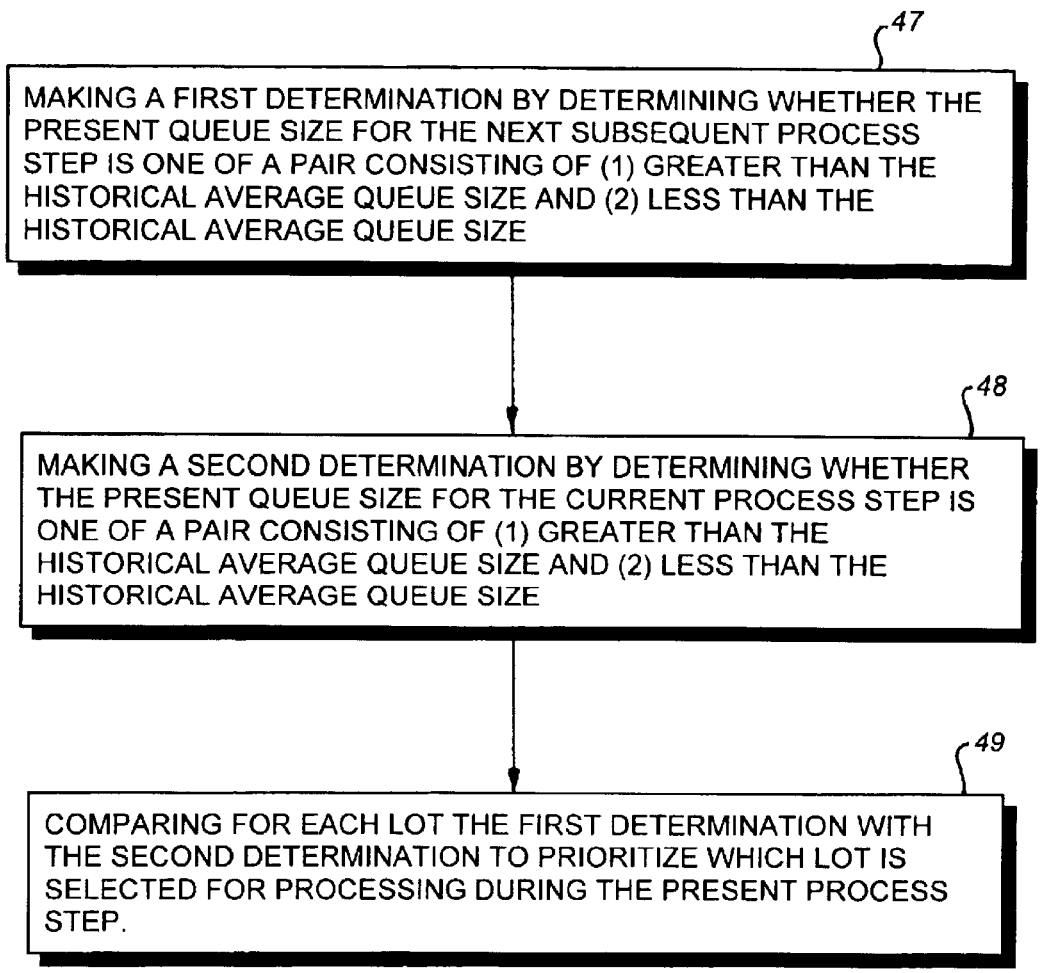

FIGS. 3 and 4 define a system for processing a product including "define process steps for product" 40, "define machine(s) used in each process step" 41, "determine lots in queue of current process step" 42, "determine process step completed by each lot prior to entering queue of current process step" 43, "determine for each lot in queue (1) the next process step after the current process step, (2) the current queue size for the next process step, and (3) the historical average queue size for the next process step" 44, and "determine for the present process step (1) the present queue size, and (2) the historical average queue size" 46. As shown in FIG. 4, the process of FIG. 3 is completed with the steps of "making a first determination by determining whether the present queue size for the next subsequent process step is one of a pair consisting of (1) greater than the historical average queue size and (2) less than the historical average queue size" 47' making a second determination by determining whether the present queue size for the current process step is one of a pair consisting of (1) greater than the historical average queue size and (2) less than the historical average queue size" 48, and, "comparing for each lot the first determination with the second determination to prioritize which lot is selected for processing during the present process step" 49.

The following examples are presentation by way of illustration, and not limitation, of the invention.

EXAMPLE 1

Product A has the process flow set forth below in Table I.

TABLE I

PROCESS FLOW FOR PRODUCT A

| Step | Cycle Time (Minutes) | Machine | Description of Machine/Function |
|---|---|---|---|
| 1 | 15 | 34 | Pull substrate |
| 2 | 1 | 32 | Pre-inspection |
| 3 | 130 | 12 | Furnace 13 |
| 4 | 1 | 125 | White light inspection |
| 5 | 30 | 29 | Laser scribe |
| 6 | 24 | 30 | Megasonic Clean |
| 7 | 1 | 73 | Peruse |
| 8 | 48 | 74 | Vapor Prime, HMDS |
| 9 | 30 | 60 | Coater, SVG Track 1 neg |
| 10 | 1 | 73 | Peruse |
| 11 | 65 | 68 | P & E Aligner 340 (1, 2, 3, 4) |
| 12 | 1 | 73 | Peruse |

TABLE I-continued

PROCESS FLOW FOR PRODUCT A

| Step | Cycle Time (Minutes) | Machine | Description of Machine/Function |
|---|---|---|---|
| 13 | 30 | 65 | Developer, SVG Track 1 neg |
| 14 | 1 | 73 | Peruse |
| 15 | 20 | 130 | Microscope |
| 16 | 35 | 93 | Oven, Bake Hard Neg |
| 17 | 18 | 80 | Bath, BOE 6:1 Etch |
| 18 | 7 | 130 | Microscope |
| 19 | 10 | 3 | HOOD 6 Bath, Piranha Diffusion |
| 20 | 5 | 130 | Microscope |
| 21 | 10 | 3 | HOOD 6 Bath, Piranha Diffusion |
| 22 | 1 | 1 | HOOD 5, HF 10:1 Diffusion |
| 23 | 14 | 4 | HOOD 7 Bath, Summa Clean |
| 24 | 330 | 22 | Furnace 42 |
| 25 | 10 | 125 | White Light Inspection |
| 26 | 1 | 1 | HOOD 5, HF 10:1 Diffusion |
| 27 | 10 | 125 | White Light Inspection |
| 28 | 640 | 67 | Measure, CD AMS 200 |
| 29 | 1 | 73 | Peruse |

EXAMPLE 2

Product B has the process flow set forth below in Table II.

TABLE II

PROCESS FLOW FOR PRODUCT B

| Step | Cycle Time (Minutes) | Machine | Description of Machine/Function |
|---|---|---|---|
| 1 | 15 | 34 | Pull substrate |
| 2 | 1 | 32 | Pre-inspection |
| 3 | 10 | 3 | HOOD 6 Bath, Piranha Diffusion |
| 4 | 14 | 4 | HOOD 7 Bath, Summa Clean |
| 5 | 178 | 19 | Furnace 33 |
| 6 | 6 | 125 | White Light Inspection |
| 7 | 1 | 73 | Peruse |
| 8 | 48 | 74 | Vapor Prime, HMDS |
| 9 | 30 | 60 | Coater, SVG Track 1 neg |
| 10 | 1 | 73 | Peruse |
| 11 | 65 | 69 | P & E Aligner 5 |
| 12 | 1 | 73 | Peruse |
| 13 | 30 | 65 | Developer, SVG Track 1 neg |
| 14 | 1 | 73 | Peruse |
| 15 | 20 | 130 | Microscope |
| 16 | 35 | 93 | Oven, Bake Hard Neg |
| 17 | 18 | 80 | Bath, BOE 6:1 Etch |
| 18 | 7 | 130 | Microscope |
| 19 | 10 | 3 | HOOD 6 Bath, Piranha Diffusion |
| 20 | 5 | 130 | Microscope |
| 21 | 10 | 3 | HOOD 6 Bath, Piranha Diffusion |
| 22 | 1 | 1 | HOOD 5, HF 10:1 Diffusion |
| 23 | 14 | 4 | HOOD 7 Bath, Summa Clean |
| 24 | 330 | 22 | Furnace 42 |
| 25 | 10 | 125 | White Light Inspection |
| 26 | 178 | 19 | Furnace |
| 27 | 10 | 125 | White Light Inspection |
| 28 | 1 | 73 | Peruse |
| 29 | 48 | 74 | VAPOR PRIME, HMDS |
| 30 | 30 | 61 | Coater, SVG Track 3 neg |
| 31 | 1 | 73 | Peruse |

EXAMPLE 3

The historical average queue size for each machine utilized when only Product A is in production on a factory floor is set forth below in Table III.

TABLE III

HISTORICAL AVERAGE QUEUE SIZE FOR EACH MACHINE WHEN ONLY PRODUCT A IS IN PRODUCTION ON FACTORY FLOOR

| Machine | Average Queue Size Lots or Boats of Product A |
|---|---|
| 1 | 4 |
| 3 | 4 |
| 4 | 4.5 |
| 12 | 5 |
| 19 | 5.5 |
| 22 | 5 |
| 29 | 3 |
| 30 | 4.4 |
| 32 | 4 |
| 34 | 2 |
| 60 | 3.5 |
| 65 | 5 |
| 67 | 4.5 |
| 68 | 5 |
| 73 | 2 |
| 74 | 5 |
| 80 | 3 |
| 93 | 2 |
| 125 | 4.5 |
| 130 | 3 |

EXAMPLE 4

Table IV sets forth the historical average queue size for each machine utilized when Products A and B are simultaneously in production on a factory floor and when at least some of the machines are utilize to process both Product A and Product B.

TABLE IV

HISTORICAL AVERAGE QUEUE SIZE FOR EACH MACHINE WHEN PRODUCTS A AND B ARE SIMULTANEOUSLY IN PRODUCTION ON THE FACTORY FLOOR

| Machine | Average Queue Size Lots or Boats of Product A or B |
|---|---|
| 1 | 4 |
| 3 | 4 |
| 4 | 5.5 |
| 12 | 4.5 |
| 19 | 5. |
| 22 | 5 |
| 29 | 3.5 |
| 30 | 3.0 |
| 32 | 4 |
| 34 | 2.5 |
| 60 | 3 |
| 61 | 4 |
| 65 | 5 |
| 67 | 4 |
| 68 | 5 |
| 69 | 4 |
| 73 | 2.5 |
| 74 | 4.5 |
| 80 | 3 |
| 93 | 2 |
| 125 | 4 |
| 130 | 3 |

EXAMPLE 5

In this Example, "One Step Ahead MIVP" is utilized to facilitate the processing of a single Product A on a factory floor in accordance with the process flow set forth in Table I in Example 1. Each Product A visits, or "re-enters", several machines more than once.

In this Example, the decisions made by Machine 125 are detailed. As would be appreciated by those of skill in the art, the same process can be utilized by other machines utilized to process Product A.

Assumptions:

One Step Ahead MIVP is utilized.

Only a single product, Product A, is being processed.

A "lot" of Product A comprises one or more of Product A in a boat or other container used to transport Product A.

A "queue" for a machine, say Machine 125 (See Table 1), includes lots of Product A which have finished being processed by a preceding machine or production process step and are ready to be processed by Machine 125.

The "present queue size" is the size of a queue for a machine or production process step at the time a machine, say Machine 125, is ready to receive and process another lot of Product A.

The "historical queue size" for each machine or production process step is the average queue size over a selected period of time prior to the present instant or point in time. The selected period of time can be a day, a week, a month, etc.

At each production flow step at least one machine is used to process Product A.

Machine 125 is an expensive, critical piece of machinery, which is used extensively and requires constant maintenance.

The objective is to determine which "lot" of Product A will next be processed by Machine 125.

When Machine 125 is available for processing in Step 4, 25, or 27 the following "lots" of Product A are ready for processing by Machine 125 (See Table I):

A lot which has just been processed in Step 3 and is ready for Step 4.

A lot which has just been processed in Step 24 and is ready for Step 25.

A lot which has just been processed in Step 26 and is ready for Step 27.

See Table I.

The following rules determine which lots of Product A will be selected by Machine 125 at each instant in time when Machine 125 is next ready to accept a lot of Product A for processing:

First priority (I) is where (a) the present queue size of Machine 125 is above its historical average (i.e., the present queue size of Machine 125 is greater than its historical average) and (b) the present queue for the Machine used in the process step immediately following Step 4, 25, 27, as the case may be, is below its historical average (i.e., the present queue size for the following process step is less than its historical average). In Table I, Machines 29, 1, 67, respectively, are used in the process Steps 5, 26, 28 which immediately follow the use of Machine 125 in Steps 4, 25, 27.

Second priority (II) is where (a) the present queue size of Machine 125 is above its historical average and (b) the present queue size for the Machine used in the process step following the use of Machine 125 is also above its historical average.

Third priority (III) is where (a) the present queue size of Machine 125 is below its historical average and (b) the present queue size of the Machine used in the process step following the use of Machine 125 is also below its historical average.

Fourth priority (IV) is where (a) the present queue size of Machine 125 is below its historical average and (b) the present queue size of the Machine used in the process step following the use of Machine 125 is, in contrast, above its historical average.

Each time Machine 125 becomes available, at that instant the present queue size of Machine 125 for each step (i.e., Steps 4, 25, 27 in Table I) in which a finished lot of Product A has arrived from a preceding process step (i.e., Steps 3, 24, 26, respectively, in Table I) is reviewed according to the priorities set forth above, i.e. in each instance where a lot of Product A has finished processing at another machine or production process step and is in the present queue of Machine 125 and ready to be processed by Machine 125, Machine 125 reviews its own present queue size and the queue size of the Machine used in the succeeding process step and assigns a priority to that lot of Product A.

If a First Priority (I) Product A lot is available, it is chosen by Machine 125 for processing. If two or more First Priority (I) Product A lots are available, only one of the lots is chosen based on selected criteria. By way of example, and not limitation, one such criteria used to determine which First Priority (I) lot is chosen can be that the Product A lot which first entered the queue (i.e., entered the Machine 125 queue before the other Product A lot or lots) is selected by Machine 125 for processing (First-In-First-Out, FIFO). Another such criteria might be that the Product A lot selected by Machine 125 is the one which has the earliest due date for shipping to customer (Due-Date-First, ODF).

If a First Priority (I) Product A lot is not available, then a Second Priority (II) Product A lot is available, then the Second Priority (II) lot is chosen. If two or more Second Priority (II) lots are available, only one of the lots is chosen for processing by Machine 125 based on selected criteria.

If neither a First (I) or Second Priority (II) Product A lot is available, and a Third Priority (III) Product A lot is available, then the Third Priority (III) lot is chosen. If two or more Third Priority (III) lots are available, only one of the lots is chosen for processing by Machine 1 based on selected criteria.

If a First (I), Second (II), or Third Priority (III) Product A lot is not available, then a Fourth Priority (IV) Product A lot is chosen. If two or more Fourth (IV) Priority lots are available, only one of the lots is chosen for processing by Machine 125 based on selected criteria.

Table V below illustrates the actual and historical queue sizes of Machines 125, 29, 1, and 67 at 9:20 a.m. when Machine 125 has finished processing a lot of Product A and is ready to select another lot for processing.

TABLE V

HISTORICAL AVERAGE QUEUE SIZE AND ACTUAL QUEUE SIZE AT 9:20 A.M. FOR SELECTED MACHINES USED IN PRODUCTION OF PRODUCT A

| Machine | Historical Average Queue Size (Lots or Boats) | Actual Queue Size at 9:20 A.M. (Lots or Boats) |
| --- | --- | --- |
| 125 | 4.5 | 5.0 |
| 29 | 3 | 2.0 |
| 1 | 4 | 5.0 |
| 67 | 4.5 | 1.0 |

The actual queue size for each machine on the factory floor at 9:20 a.m. is determined when the system and apparatus of the invention is utilized for each machine on the factory floor. As would be appreciated by those of skill in the art, for purpose of the Example only the machines listed in Table V are necessary.

At 9:20 a.m., the five (5) lots in the queue of Machine 125 include two lots which arrived from Step 3 (Machine 12), one lot which arrived from Step 24 (Machine 22), and two lots which arrived from Step 26 (Machine 1).

Since at 9:20 a.m. the number of lots in the queue of Machine 125 is above the historical average of Machine 125 and the number of lots in the queue of Machine 29 is below the historical average of Machine 29, the lots of Product A which are ready at 9:20 a.m. to be processed by Machine 125 in Step 4 and to travel on to Machine 29 in Step 5 meet the $1^{st}$ Priority criteria set forth above.

Since at 9:20 a.m. the number of lots in the queue of Machine 125 is above the historical average of Machine 125 and the number of lots in the queue of Machine 1 is above the historical average of Machine 1, the lot of Product A which is ready at 9:20 a.m. to be processed by Machine 125 in Step 25 and to travel on to Machine 1 in Step 26 meet the $2^{nd}$ Priority criteria set forth above.

Since at 9:20 a.m. the number of lots in the queue of Machine 125 is above the historical average of Machine 125 and the number of lots in the queue of Machine 67 is below the historical average of Machine 67, the lots of Product A which are ready at 9:20 a.m. to be processed by Machine 125 in Step 27 and to travel on to Machine 67 in Step 28 meet the $1^{st}$ Priority criteria set forth above.

At 9:20 a.m., none of the lots of Product A in the queue of machine 125 meet the $3^{rd}$ Priority or $4^{th}$ Priority criteria.

Since the lots of Product A ready to travel to Machine 29 (Step 5 in Table I) or 67 (Step 28 in Table I) both meet the $1^{st}$ Priority criteria, Machine 125 utilizes an additional criteria to select which lot of Product A will be selected and processed by Machine 125. By way of example and not limitation, one such criteria can be that the lot of A which first entered and is in the queue of Machine 125 to be processed by Machine 125 and travel on to Machine 29 or 67 is selected over other lots of Product A which also entered and are in the queue of Machine 125 to be processed by Machine 125 and travel to Machine 29 or 67 (First-In-First-Out, FIFO).

Table VI below illustrates the actual and historical queue sizes of Machines 125, 29, 1, and 67 at 9:31 a.m. when Machine 125 has finished processing the lot selected at 9:20 a.m. and is ready to select another lot for processing.

TABLE VI

HISTORICAL AVERAGE QUEUE SIZE AND ACTUAL QUEUE SIZE AT 9:31 A.M. FOR SELECTED MACHINES USED IN PRODUCTION OF PRODUCT A

| Machine | Historical Average Queue Size (Lots or Boats) | Actual Queue Size at 9:31 A.M. (Lots or Boats) |
| --- | --- | --- |
| 125 | 4.5 | 4.0 |
| 29 | 3 | 4.0 |
| 1 | 4 | 3.0 |
| 67 | 4.5 | 6.0 |

The actual queue size for each machine on the factory floor at 9:31 a.m. is determined when the system and apparatus of the invention is utilized for each machine on the factory floor. As would be appreciated by those of skill in the art, for purpose of this Example only the machines listed in Table VI are necessary.

At 9:31 a.m., the four (4) lots in the queue of Machine 125 include two lots which arrived from Step 3 (Machine 12), one lot which arrived from Step 24 (Machine 22), and one lot which arrived from Step 26 (Machine 1).

Since at 9:31 a.m. the number of lots in the queue of Machine 125 is below the historical average of Machine 125 and the number of lots in the queue of Machine 29 is above the historical average of Machine 29, the lots of Product A which are ready at 9:31 a.m. to be processed by Machine 125 in Step 4 and to travel on to Machine 29 in Step 5 meet the 4th Priority criteria set forth above.

Since at 9:31 a.m. the number of lots in the queue of Machine 125 is below the historical average of Machine 125 and the number of lots in the queue of Machine 1 is below the historical average of Machine 1, the lot of Product A which is ready at 9:31 a.m. to be processed by Machine 125 in Step 25 and to travel on to Machine 1 in Step 26 meets the 3rd Priority criteria set forth above.

Since at 9:31 a.m. the number of lots in the queue of Machine 125 is below the historical average of Machine 125 and the number of lots in the queue of Machine 67 is above the historical average of Machine 67, the lot of Product A which is ready at 9:31 a.m. to be processed by Machine 125 in Step 27 and to travel on to Machine 67 in Step 28 meets the 4th Priority criteria set forth above.

At 9:31 a.m., none of the lots of Product A in the queue of Machine 125 meet the $1^{st}$ priority or $2^{nd}$ priority criteria.

Since the lot or lots of Product A, which will travel to Machine 1 for processing (after being processed by Machine 125) meet the 3rd Priority criteria, Machine 125 selects this lot or lots for processing. If there are two or more lots of Product A, each having equivalent priority, which will be processed by Machine 1 after being processed by Machine 125, Machine 125 utilizes an additional criteria to select which lot of Product A will be selected and processed by Machine 125. By way of example and not limitation, one such criteria can be that the lot of A which first entered and is in the queue of Machine 125 to be processed by Machine 125 and travel on to Machine 1 is selected over other lots of Product A which also entered and are in the queue of Machine 125 to be processed by Machine 125 and travel to Machine 1 (First-in-First-Out).

EXAMPLE 6

In this Example, "One Step Ahead MIVP" is utilized to facilitate the processing of two Products A and B on a factory floor in accordance with the process flows set forth in Tables I and II in Examples 1 and 2. Each Product A and B visits, or "re-enters", several machines more than once during its process flow.

In this Example, the decisions made by Machine 125 are detailed. As would be appreciated by those of skill in the art, the same decision-making process can be utilized (1) by each of the other machines utilized to process Products A and B, and (2) when three or more products are being simultaneously processed on the factory floor and each product is processed by a machine which utilizes a machine also utilized by at least one of the other products being processed.

Each Product A and B has a different sequence of processing steps as shown by Tables I and II in Examples I and II. Each Product A and B visits at least one machine on the factory floor two or more times during processing. Products A and B typically visits two or more times during processing each of two or more machines on the factory floor.

Assumptions:

One Step Ahead MIVP is utilized.

Two products, Product A and Product B, are being processed.

A "lot" of Product A comprises one or more of Product A in a boat or other container used to transport Product A.

A "lot" of Product B comprises one or more of Product B in a boat or other container used to transport Product B.

A "queue" for a machine, say Machine 125, includes lots of Product A and/or Product B which have finished processing by a preceding machine or production flow step and are ready to be processed by Machine 125.

The "present queue size" is the size of a queue for a machine or production process step at the instant in time a machine, say Machine 125, is ready to receive and process another lot of Product A or B. The present queue size of a machine includes all lots of Product A or B that are ready to be processed by the machine.

At each production flow step at least one machine is used to process Product A or Product B. The processing of Product B may include machines not used during the processing of Product A, and vice-versa.

Machine 125 is an expensive, critical piece of machinery that is used extensively and requires constant maintenance.

The objective is, at the instant Machine 125 is ready to accept and process at lot of Product A or B, to determine which "lot" of Product A or Product B will next be selected by Machine 125 in order to most efficiently utilize the machines down line from Machine 125.

There is no priority to process Product A before Product B, or vice-versa. Each product is a critical product, which must be processed as quickly as possible.

When Machine 125 is available for processing in Step 4, 25, or 27 during the processing of Product A (See Table I), the following "lots" of Product A are ready for processing by Machine 125:

A lot which has just been processed in Step 3 and is ready for Step 4.

A lot which has just been processed in Step 24 and is ready for Step 25.

A lot which has just been processed in Step 26 and is ready for Step 27.

When Machine 125 is available for processing in Step 6, 25, or 27 during the processing of Product B (See Table II), the following "lots" of Product B are ready for processing by Machine 125:

A lot which has just been processed in Step 5 and is ready for Step 6.

A lot which has just been processed in Step 24 and is ready for Step 25.

A lot which has just been processed in Step 26 and is ready for Step 27.

The following rules determine which lot of Product A or Product B will be selected by Machine 125 from its queue at each instant in time when Machine 125 is next ready to accept a lot of Product A or Product B for processing:

First priority (I) is where (a) the present queue size of Machine 125 is above its historical average (i.e., the present queue size of Machine 125 is greater than its historical average) and (b) the present queue for the Machine used in the process step immediately following Step 4, 25, 27 (for Product A in Table I) or immediately following Step 6, 25, 27 (for Product B in Table II), as the case may be, is below its historical average (i.e., the present queue size for the following process step is less than its historical average). In Table I, Machines 29, 1, 67, respectively, are used in the process Steps 5, 26, 28 that immediately follow the use of Machine 125 in Steps 4, 25, 27. In Table II, Machines 73, 19, 73 are used in process Steps 7, 26, 28 that immediately follow the use of Machine 125 in Steps 6, 25, 27.

Second priority (II) is where (a) the present queue size of Machine 125 is above its historical average and (b) the present queue size for the Machine used in the process step for Product A or Product B, as the case may be, following the use of Machine 125 is also above its historical average.

Third priority (III) is where (a) the present queue size of Machine 125 is below its historical average and (b) the present queue size of the Machine used in the process step for Product A or Product B, as the case may be, following the use of Machine 125 is also below its historical average.

Fourth priority (IV) is where (a) the present queue size of Machine 125 is below its historical average and (b) the present queue size of the Machine used in the process step for Product A or Product B, as the case may be, following the use of Machine 125 is, in contrast, above its historical average.

Each time Machine 125 becomes available to process a lot of Product A or Product B, at that instant the present queue size of Machine 125 for each step (i.e., Steps 4, 25, 27 in Table I and Steps 6, 25, 27 in Table II) in which a finished lot of Product A or B has arrived from a preceding process step (i.e., Steps 3, 24, 26, respectively, in Table I and Steps 5, 24, 26 in Table II) is reviewed according to the priorities set forth above. This means that in each instance where a lot of Product A or B has finished processing at another machine (process step) and is in the present queue of Machine 125 Machine and ready to be processed by Machine 125, Machine 125 reviews its own present queue size and the present queue size of the Machine to be used in the succeeding process step and assigns a priority to that lot of Product A or Product B.

If a First Priority (I) Product A lot or B lot is available, it is chosen by Machine 125 for processing. If two or more First Priority (I) Product A or Product B lots are available, only one of the lots is chosen based on selected criteria. By way of example, and not limitation, one such criteria used to determine which First Priority (I) lot is chosen can be that the Product A lot or Product B lot which first entered the queue (i.e., entered the Machine 125 queue before the other Product A or Product B lot or lots) is selected by Machine 125 for processing (First-In-First-Out, FIFO). Another such criteria might be that the Product A lot or Product B lot selected by Machine 125 is the one, which has the earliest due date for shipping to customer (Due-Date-First, DDF).

If a First Priority (I) Product A or Product B lot is not available, and a Second Priority (II) Product A or Product B lot is available, then the Second Priority (II) lot is chosen. If two or more Second Priority (II) lots are available, only one of the lots is chosen for processing by Machine 125 based on selected criteria.

If neither a First (I) or Second Priority (II) Product A or Product B-lot is available, and a Third Priority (III) Product A or Product B lot is available, then the Third Priority (III) lot is chosen. If two or more Third Priority (III) lots are available, only one of the lots is chosen for processing by Machine 125 based on selected criteria.

If a First (I), Second (II), or Third Priority (III) Product A or Product B lot is not available, then a Fourth Priority (IV) Product A or Product B lot is chosen. If two or more Fourth (IV) Priority lots are available, only one of the lots is chosen for processing by Machine 125 based on selected criteria.

Table VII illustrates the actual and historical queue sizes of Machines 29, 1, and 67 (Table I), of Machines 19 and 73 (Table II), and of Machine 125 (Tables I and II) at 9:20 a.m. when Machine 125 has finished processing a lot of Product A or Product B and is ready to select another lot for processing.

TABLE VII

HISTORICAL AVERAGE QUEUE SIZE AND ACTUAL QUEUE SIZE AT 9:20 A.M. FOR SELECTED MACHINES USED IN PRODUCTION OF PRODUCT A AND PRODUCT B

| Machine | Historical Average Queue Size (Lots or Boats of Product A or B) | Actual Queue Size at 9:20 A.M. (Lots or Boats) |
|---|---|---|
| 125 | 4 | 6.0 |
| 29 | 3.5 | 2.0 |
| 1 | 4 | 5.0 |
| 67 | 4 | 1.0 |
| 19 | 5 | 6.0 |
| 73 | 2.5 | 5.0 |

The actual queue size for each machine on the factory floor at 9:20 a.m. is determined when the system and apparatus of the invention is utilized for each machine on the factory floor. As would be appreciated by those of skill in the art, for purposes of this Example only the machines listed in Table VII are necessary.

At 9:20 a.m., the six (6) lots in the queue of Machine 125 include one lot of Product A which arrived from Step 3 in Table I (i.e., arrived after being processed by Machine 12), one lot of Product A which arrived from Step 24 in Table I (i.e., arrived after being processed by Machine 22), one lot of Product A which arrived from Step 26 in Table I (i.e., arrived after being processed by Machine 1), one lot of Product B which arrived from Step 5 in Table II (i.e., arrived after being processed by Machine 19), one lot of Product B which arrived from Step 24 in Table II (i.e., arrived after being processed by Machine 22), and one lot of Product B which arrived from Step 26 in Table II (i.e., arrived after being processed by Machine 19).

Since at 9:20 a.m. the number of lots in the queue of Machine 125 is above the historical average of Machine 125 and the number of lots in the queue of Machine 29 is below its historical average of Machine 29, the lot of Product A which is in the queue of and ready at 9:20 a.m. to be processed by Machine 125 in Step 4 and to travel on to Machine 29 in Step 5 (Table I) meets the $1^{st}$ Priority criteria set forth above.

Since at 9:20 a.m. the number of lots in the queue of Machine 125 is above the historical average of Machine 125 and the number of lots in the queue of Machine 1 is above the historical average of Machine 1, the lot of Product A which is in the queue of and ready at 9:20 a.m. to be processed by Machine 125 in Step 25 and to travel on to Machine 1 in Step 26 meets the $2^{nd}$ Priority criteria set forth above.

Since at 9:20 a.m. the number of lots in the queue of Machine 125 is above the historical average of Machine 125 and the number of lots in the queue of Machine 67 is below the historical average of Machine 67, the lot of Product A which is in the queue of and ready at 9:20 a.m. to be processed by Machine 125 in Step 27 and to travel on to Machine 67 in Step 28 meets the $1^{st}$ Priority criteria set forth above.

At 9:20 a.m., none of the lots of Product A in the queue of machine 125 meet the $3^{rd}$ Priority or $4^{th}$ Priority criteria.

Since at 9:20 a.m. the number of lots in the queue of Machine 125 is above the historical average of Machine 125 and the number of lots in the queue of Machine 74 is above its historical average, the lot of Product B which is in the queue of and ready at 9:20 a.m. to be processed by Machine 125 in Step 6 (Table II) and to travel on to Machine 73 in Step 7 (Table II) after the visual inspect in Step 7 meets the 2nd Priority criteria set forth above.

Since at 9:20 a.m. the number of lots in the queue of Machine 125 is above the historical average of Machine 125 and the number of lots in the queue of Machine 19 is above the historical average of Machine 19, the lot of Product B which is in the queue of and ready at 9:20 a.m. to be processed by Machine 125 in Step 25 (Table II) and to travel on to Machine 19 in Step 26 (Table II) meets the $2^{nd}$ Priority criteria set forth above.

Since at 9:20 a.m. the number of lots in the queue of Machine 125 is above the historical average of Machine 125 and the number of lots in the queue of Machine 74 is above the historical average of Machine 74, the lot of Product B which is in the queue of and ready at 9:20 a.m. to be processed by Machine 125 in Step 27 (Table II) and to travel on to Machine 74 in Step 29 (Table II) meets the 2nd Priority criteria set forth above.

At 9:20 a.m., none of the lots of Product A in the queue of machine 125 meet the $1^{st}$, $3^{rd}$, or 4th Priority criteria.

Since the lots of Product A ready to travel to Machine 29 or 67 (Table I) both meet the $1^{st}$ Priority criteria, Machine 125 utilizes an additional criteria to select which lot of Product A will be selected and processed by Machine 125. By way of example and not limitation, one such criteria can be that the lot of A which first entered and is in the queue of Machine 125 to be processed by Machine 125 and travel on to Machine 29 or 67 is selected over other lots of Product A which also entered and are in the queue of Machine 125 to be processed by Machine 125 and travel to Machine 29 or 67 (First-In-First-Out, FIFO).

Table VII illustrates the actual and historical queue sizes of Machines 125, 29, 1 (Table I) and Machines 19 and 73 (Table II) at 9:31 a.m. when Machine 125 has finished processing the lot selected at 9:20 a.m. and is ready to select another lot for processing.

TABLE VIII

HISTORICAL AVERAGE QUEUE SIZE
AND QUEUE SIZE AT 9:31 A.M. FOR
SELECTED MACHINES USED IN PRODUCTION
OF PRODUCT A and PRODUCT B

| Machine | Historical Average Queue Size (Lots or Boats of Product A or B) | Actual Queue Size at 9:31 A.M. (Lots or Boats) |
| --- | --- | --- |
| 125 | 4 | 5.0 |
| 29 | 3.5 | 4.5 |
| 1 | 4 | 3.0 |
| 67 | 4 | 6.0 |
| 19 | 5 | 2.0 |
| 73 | 2.5 | 6.0 |

The actual queue size for each machine on the factory floor at 9:31 a.m. is determined when the system and apparatus of the invention is utilized for each machine on the factory floor. As would be appreciated by those of skill in the art, for purposes of this Example only the machines listed in Table VIII are necessary.

At 9:31 a.m., the five (5) lots in the queue of Machine 125 include one lot of Product A which arrived from Step 3 in Table I (i.e., arrived after being processed by Machine 12), one lot of Product A which arrived from Step 24 in Table I (i.e., arrived after being processed by Machine 22), one lot of Product B which arrived from Step 5 in Table II (i.e., arrived after being processed by Machine 19), one lot of Product B which arrived from Step 24 in Table II (i.e., arrived after being processed by Machine 22), and one lot of Product B which arrived from Step 26 in Table II (i.e., arrived after being processed by Machine 19).

Since at 9:31 a.m. the number of lots in the queue of Machine 125 is above the historical average of Machine 125 and the number of lots in the queue of Machine 29 is above the historical average of Machine 29, the lot or lots of Product A which are ready at 9:31 a.m. to be processed by Machine 125 in Step 4 and to travel on to Machine 29 in Step 5 meet the 2nd Priority criteria set forth above.

Since at 9:31 a.m. the number of lots in the queue of Machine 125 is above the historical average of Machine 125 and the number of lots in the queue of Machine 1 is below the historical average of Machine 1, the lot or lots of Product A which are ready at 9:31 a.m. to be processed by Machine 125 in Step 25 and to travel on to Machine 1 in Step 26 meet the 1st Priority criteria set forth above.

Since at 9:31 a.m. the number of lots in the queue of Machine 125 is above the historical average of Machine 125 and the number of lots in the queue of Machine 67 is above the historical average of Machine 67, the lot or lots of Product A which are ready at 9:31 a.m. to be processed by Machine 125 in Step 27 and to travel on to Machine 67 in Step 28 meet the $2^{nd}$ Priority criteria set forth above.

At 9:31 a.m., none of the lots of Product A in the queue of Machine 125 meet the $3^{th}$ or $4^{th}$ priority criteria.

Since at 9:31 a.m. the number of lots in the queue of Machine 125 is above the historical average of Machine 125 and the number of lots in the queue of Machine 73 is above its historical average, the lot of Product B which is in the queue of and ready at 9:31 a.m. to be processed by Machine 125 in Step 6 (Table II) and to travel on to Machine 73 in Step 6 meets the 2nd Priority criteria set forth above.

Since at 9:31 a.m. the number of lots in the queue of Machine 125 is above the historical average of Machine 125 and the number of lots in the queue of Machine 19 is below the historical average of Machine 19, the lot of Product B which is in the queue of and ready at 9:31 a.m. to be processed by Machine 125 in Step 25 (Table II) and to travel on to Machine 19 in Step 26 (Table II) meets the 1st Priority criteria set forth above.

Since at 9:31 a.m. the number of lots in the queue of Machine 125 is above the historical average of Machine 125 and the number of lots in the queue of Machine 74 is above the historical average of Machine 74, the lot of Product B which is in the queue of and ready at 9:31 a.m. to be processed by Machine 125 in Step 27 (Table II) and to travel on to Machine 73 in Step 28 (Table II) meets the 2nd Priority criteria set forth above.

At 9:31 a.m., none of the lots of Product A or of Product B in the queue of machine 125 meet the $3^{rd}$ or 4th Priority criteria.

Since the lot of Product A which will travel to Machine 1 for processing (after being processed by Machine 125 in Step 25 of Table I) meets the 1st Priority criteria, and since the lot of Product B which will travel to Machine 19 for processing (after being processed by Machine 125 in Step 25 of Table II), Machine 125 selects one of these two "$1^{st}$ Priority" lots for processing. Machine 125 utilizes an additional criteria to select either the lot of Product A or Product B will be selected and processed by Machine 125. By way of example and not limitation, one such criteria can be that the lot which first entered and is in the queue of Machine 125 to be processed by Machine 125 is selected over lot which entered the queue of Machine 125 at a later time (First-In-First-Out, FIFO).

EXAMPLE 7

In this Example, "N Step Ahead MIVP" is utilized to facilitate the processing of lots of a Product A on a factory floor in accordance with the process flows set forth in Table I in Examples 1. Each lot of Product A visits, or "re-enters", several machines more than once.

In this Example, the decisions made by Machine 125 are detailed. As would be appreciated by those of skill in the art, the same decision-making process can be utilized by each of the other machines utilized to process Product A.

Assumptions:
  N-Step Ahead MIVP is utilized.
  N can be from two to ten. For this example, it is assumed N=2.
  A "queue" for a machine, say Machine 125 (See Table I in Example 1), includes lots of Product A which have finished processing by a preceding machine or production flow step and are ready to be processed by Machine 125.
  The "present queue size" is the size of a queue for a machine or production process step at the time a machine, say Machine 125, is ready to receive and process another lot of Product A.
  The "historical queue size" for each machine or production process step is the average queue size over a selected period of time prior to the present instant or point in time. The selected period of time can be a day, a week, a month, etc.
  The N process steps include the next process steps immediately after the process step in which a machine, for example Machine 125, is utilized.
  Only a single product, Product A, is being processed.
  A "lot" of Product A comprises one or more of Product A in a boat or other container used to transport Product A.
  At each production flow step at least one machine is used to process Product A.
  Machine 125 is an expensive, critical piece of machinery, which is used extensively and requires constant maintenance.
  The objective is to determine which "lot" of Product A will next be processed by Machine 125.
  When Machine 125 is available for processing in Step 4, 25, or 27 the following "lots" of Product A are ready for processing by Machine 125 (See Table I):
    A lot which has just been processed in Step 3 and is ready for Step 4.
    A lot which has just been processed in Step 24 and is ready for Step 25.
    A lot which has just been processed in Step 26 and is ready for Step 27.
  See Table I.
  The following rules determine which lots of Product A will be selected by Machine 125 at each instant in time when Machine 125 is next ready to accept a lot of Product A for processing:
    First priority (I) is where (a) the present queue size of Machine 125 is above its historical average (i.e., the present queue size of Machine 125 is greater than its historical average) and (b) the present average of the following queues for the N machines or process steps ahead (N=2 in this example, so it is the present average of the queues for the two succeeding processing machines or process steps) used to Process a lot of Product A immediately after Step 4, 25, 27, as the case may be, is below its historical average (i.e., the present average queue size for the two process steps following processing by Machine 125 is less than the historical average queue size of the two process steps). The historical average is determined by adding together the present queue size of each of N machines or process steps and by dividing the resulting sum by N. For example, if a machine 74 has a historical queue consisting of eight (8) lots of Product A and/or B and the next succeeding machine 60 has a historical queue of four (4) lots of Product A, then the average historical queue size equals (8+4)/2=6 lots of Product A. The present average queue size is determined by adding together the present queue size of each of N machines or process steps and by dividing the resulting sum by N. For example, if a machine 74 has a present queue size consisting of four (4) lots of Product A the next succeeding machine 60 used to process Product A has a present queue size of six (6) lots of Product A, then the average present queue size equals (4+6)/2=5 lots of Product A.
    In Table I, Machines 29, 1, 67, respectively, are used in the process Steps 5, 26, 28 that immediately follow the use of Machine 125 in Steps 4, 25, 27.
    Second priority (II) is where (a) the present queue size of Machine 125 is above its historical average and (b) the present average queue size for the N Machines used in the process step following the use of Machine 125 is also above the historical average queue size for the N Machines.

Third priority (III) is where (a) the present queue size of Machine 125 is below its historical average and (b) the present average queue size of the N Machines used in the process steps following the use of Machine 125 is also below the historical average queue size for the N Machines.

Fourth priority (IV) is where (a) the present queue size of Machine 125 is below its historical average and (b) the present queue size of the N Machine used in the process steps following the use of Machine 125 is, in contrast, above the historical average queue size for the N Machines.

Each time Machine 125 becomes available, at that instant the present queue size of Machine 125 for each step (i.e., Steps 4, 25, 27 in Table I) in which a finished lot of Product A has arrived from a preceding process step (i.e., Steps 3, 24, 26, respectively, in Table I) is reviewed according to the priorities set forth above, i.e. in each instance where a lot of Product A has finished processing at another machine or production process step preceding Machine 125 and is now in the present queue of Machine 125 and ready to be processed by Machine 125, Machine 125

(a) compares its own present queue size to its historical average queue size;
(b) compares the present average queue size and historical average queue size of the N Machines to be used in the succeeding process steps for that lot of Product A; and,
(c) assigns a priority to that lot of Product A based on whether the present queue sizes of Machine 125 and of the N Machines following Machine 125 are greater or less than the historical queue sizes of the same.

If a First Priority (I) Product A lot is available, it is chosen by Machine 125 for processing. If two or more First Priority (I) Product A lots are available, only one of the lots is chosen based on selected criteria. By way of example, and not limitation, one such criteria used to determine which First Priority (I) lot is chosen can be that the Product A lot which first entered the queue (i.e., entered the Machine 125 queue before the other Product A lot or lots) is selected by Machine 125 for processing (First-In-First-Out, FIFO). Another such criteria might be that the Product A lot selected by Machine 125 is the one, which has the earliest due date for shipping to customer (Due-Date-First, DDF).

If a First Priority (I) Product A lot is not available, then a Second Priority (II) Product A lot is available, then the Second Priority (II) lot is chosen. If two or more Second Priority (II) lots are available, only one of the lots is chosen for processing by Machine 125 based on selected criteria.

If neither a First (I) or Second Priority (II) Product A lot is available, and a Third Priority (III) Product A lot is available, then the Third Priority (III) lot is chosen. If two or more Third Priority (III) lots are available, only one of the lots is chosen for processing by Machine 1 based on selected criteria.

If a First (I), Second (II), or Third Priority (III) Product A lot is not available, then a Fourth Priority (IV) Product A lot is chosen. If two or more Fourth (IV) Priority lots are available, only one of the lots is chosen for processing by Machine 125 based on selected criteria.

Tables IX and X below illustrate (1) the actual and historical queue sizes of Machines 125, 29, 1, and 67 at 9:20 a.m. when Machine 125 has finished processing a lot of Product A and is ready to select another lot for processing, and (2) the historical average queue sizes and present average queue sizes for machine pairs (since N=2).

TABLE IX

HISTORICAL AVERAGE QUEUE SIZE AND ACTUAL QUEUE SIZE AT 9:20 A.M. FOR SELECTED MACHINES USED IN PRODUCTION OF PRODUCT A

| Machine | Historical Average Queue Size (Lots or Boats) | Actual Queue Size at 9:20 A.M. (Lots or Boats) |
| --- | --- | --- |
| 125 | 4.5 | 5.0 |
| 29 | 3 | 2.0 |
| 30 | 4.4 | 1.0 |
| 1 | 4 | 5.0 |
| 125 | 4.5 | 5.0 |
| 67 | 4.5 | 1.0 |
| 73 | 2 | 0 |

At 9:20 a.m., the five (5) lots in the queue of Machine 125 include two lots that arrived from Step 3 (Machine 12), one lot that arrived from Step 24 (Machine 22), and two lots which arrived from Step 26 (Machine 1).

TABLE X

HISTORICAL AVERAGE QUEUE SIZE AND PRESENT AVERAGE QUEUE SIZE AT 9:20 A.M. FOR SELECTED N (N = 2) MACHINE PAIRS USED IN PRODUCTION OF PRODUCT A IN SUCCESSIVE STEPS IN TABLE I

| N Machine Pair | Historical Average Queue Size | Present Average Queue Size |
| --- | --- | --- |
| 29 (Step 5 & 30 (Step 6) | (3 + 4.4)/2 = 3.7 | (2.0 + 1.0)/2 = 1.5 |
| 1 (Step 26) & 125 (Step 27) | (4 + 4.5)/2 = 4.25 | (5.0 + 5.0)/2 = 5.0 |
| 67 (Step 28) & 73 (Step 29 last Machine step) | (4.5 + 2)/2 = 3.25 | (1.0 + 0)/2 = 0.5 |

The actual queue size and present average queue size for each machine or N Machines, as the case may be, on the factory floor at 9:20 a.m. can, when the system and apparatus of the invention is utilized, be determined for each machine or N machines on the factory floor. As would be appreciated by those of skill in the art, for purposes of this Example only the machines listed in Tables IX and X are necessary.

If N=3, then the queues for the three machines subsequent to Machine 125 would be averaged in Table X; if N=4, then the queues for the four machines subsequent to Machine 125 would be averaged; etc. Since in this Example 7N=2, only the queues of the two machines subsequent to Machine 125 are averaged.

Since at 9:20 a.m. the actual queue size (5 lots—See Table IX) of Machine 125 is greater than the historical average queue size (4.5 lots—See Table IX) of Machine 125 and the present average size (1.5 lots—See Table X) of the queues of Machines 29 and 30 is below the historical average queue size (3.0 lots—See Table X) of Machines 29 and 30, the lots of Product A which are ready at 9:20 a.m. to be processed by Machine 125 in Step 4 and to travel on to Machines 29 and 30 in Steps 5 and 6 meet the 1St Priority criteria set forth above.

Since at 9:20 a.m. the actual queue size (5 lots—See Table IX) of Machine 125 is above the historical average queue size (4.5 lots—See Table IX) of Machine 125 and the present average size (5.0 lots—See Table X) of the queues of Machines 1 and 125 is above the historical average queue size (4.25 lots—See Table X) of Machines 1 and 125, the lot of Product A which is ready at 9:20 a.m. to be processed by Machine 125 in Step 25 and to travel on to Machines land 125 in Steps 26 and 27 meet the $2^{nd}$ Priority criteria set forth above.

Since at 9:20 a.m. the actual queue size (5 lots—See Table IX) of Machine 125 is above the historical average queue size (4.5 lots—See Table IX) of Machine 125 and the present average size (0.5 lots—See Table X) of the queues of Machines 67 and 73 is below the historical average queue size (3.25 lots—See Table X) of Machines 67 and 73, the lots of Product A which are ready at 9:20 a.m. to be processed by Machine 125 in Step 27 and to travel on to Machines 67 and 73 in Steps 28 and 29 meet the $1^{st}$ Priority criteria set forth above.

If there were no Step 29 in Table I and Step 28 were the last step listed in Table I, the Historical Average Queue Size of 3.25 lots and the Present Average Queue Size of 0.5 in Table X for the "N Machine Pair" including Machine 67 would be 4.5 and 1.0 respectively. In other words, if there are fewer than N Machines left in the processing of a lot of Product A then the N Machine calculation does not include N Machines, but only includes a number of machines less than N Machines.

At 9:20 a.m., none of the lots of Product A in the queue of machine 125 meet the $3^{rd}$ Priority or $4^{th}$ Priority criteria.

Since the lots of Product A ready to travel to Machine 29, 30 (Steps 5 and 6 in Table I) or 67, 73 (Steps 28, 29 in Table I) both meet the $1^{st}$ Priority criteria, Machine 125 utilizes an additional criteria to select which lot of Product A will be selected and processed by Machine 125. By way of example and not limitation, one such criteria can be that the lot of A which first entered and is in the queue of Machine 125 to be processed by Machine 125 and travel on to Machine 29 or 67 is selected over other lots of Product A which also entered and are in the queue of Machine 125 to be processed by Machine 125 and travel to Machine 29 or 67 (First-In-First-out, FIFO).

Tables XI and XII below illustrate (1) the actual and historical queue sizes of Machines 125, 29, 1, and 67 at 9:31 a.m. when Machine 125 has finished processing a lot of Product A and is ready to select another lot for processing, and (2) the historical average queue sizes and present average queue sizes for machine pairs (since N=2).

TABLE XI

HISTORICAL AVERAGE QUEUE SIZE AND
ACTUAL QUEUE SIZE AT 9:31 A.M. FOR
SELECTED MACHINES IN PRODUCTION OF PRODUCT A

| Machine | Historical Average Queue Size (Lots or Boats) | Actual Queue Size at 9:31 A.M. (Lots or Boats) |
|---|---|---|
| 125 | 4.5 | 4.0 |
| 29 | 3 | 2.0 |
| 30 | 4.4 | 4.0 |
| 1 | 4 | 3.0 |
| 67 | 4.5 | 6.0 |
| 73 | 2 | 0.0 |

The actual queue size for each machine on the factory floor at 9:31 a.m. is, when the system and apparatus of the invention is utilized, determined for each machine on the factory floor. As would be appreciated by those of skill in the art, for purposes of this Example only the machines listed in Table XI are necessary.

At 9:31 a.m., the four (4) lots of Product A in the queue of Machine 125 include two lots which arrived from Step 3 (Machine 12), one lot which arrived from Step 24 (Machine 22), and one lot which arrived from Step 26 (Machine 1).

TABLE XII

HISTORICAL AVERAGE QUEUE SIZE AND
PRESENT AVERAGE QUEUE SIZE AT 9:20 A.M.
FOR SELECTED N (N = 2) MACHINE
PAIRS USED IN PRODUCTION OF PRODUCT A
IN SUCCESSIVE STEPS IN TABLE I

| N Machine Pair | Historical Average Queue Size | Present Average Queue Size |
|---|---|---|
| 29 (Step 5) & 30 (Step 6) | (3 + 4.4)/2 = 3.7 | (2.0 + 4.0)/2 = 3.0 |
| 1 (Step 26) & 125 (Step 27) | (4 + 4.5)/2 = 4.25 | (3.0 + 4.0)/2 = 3.5 |
| 67 (Step 28) & 73 (Step 29 last Machine step) | (4.5 + 2)/2 = 3.75 | (6.0 + 0)/2 = 3.0 |

Since at 9:31 a.m. the actual queue size (4 lots—See Table XI) of Machine 125 is less than the historical average queue size (4.5 lots—See Table XI) of Machine 125 and the present average size (3.0 lots—See Table XII) of the queues of Machines 29 and 30 is less than the historical average queue size (3.7 lots—See Table XII) of Machines 29 and 30, the lots of Product A which are ready at 9:31 a.m. to be processed by Machine 125 in Step 4 and to travel on to Machines 29 and 30 in Steps 5 and 6 meet the $3^{rd}$ Priority criteria set forth above.

Since at 9:31 a.m. the actual queue size (4 lots—See Table XI) of Machine 125 is below the historical average queue size (4.5 lots—See Table XI) of Machine 125 and the present average size (3.5 lots—See Table XII) of the queues of Machines 1 and 125 is below the historical average queue size (4.25 lots—See Table XII) of Machines 1 and 125, the lot of Product A which is ready at 9:31 a.m. to be processed by Machine 125 in Step 25 and to travel on to Machines 1 and 125 in Steps 26 and 27 meet the 3rd Priority criteria set forth above.

Since at 9:31 a.m. the actual queue size (4 lots—See Table XI) of Machine 125 is below the historical average queue size (4.5 lots—See Table XI) of Machine 125 and the present average size (3.0 lots—See Table XII) of the queues of Machines 67 and 73 is below the historical average queue size (3.75 lots—See Table XII) of Machines 67 and 73, the lots of Product A which are ready at 9:20 a.m. to be processed by Machine 125 in Step 27 and to travel on to Machines 67 and 73 in Steps 28 and 29 meet the $3^{rd}$ Priority criteria set forth above.

If there were no Step 29 in Table I and Step 28 were the last step listed in Table I, the Historical Average Queue Size of 3.75 lots and the Present Average Queue Size of 3.0 in Table XII for the "N Machine Pair" including Machine 67 would be 4.5 and 6.0 respectively. In other words, if there are fewer than N Machines left in the processing of a lot of Product A then the N Machine calculation does not include N Machines, but only includes a number of machines less than N Machines.

At 9:31 a.m., none of the lots of Product A in the queue of machine 125 meet the 1st Priority, 2nd Priority or $4^{th}$ Priority criteria.

Since the lot of Product A which is ready at 9:31 a.m. to be processed by Machine 125 in Steps 4, 25 and 27 traveling to Machines 29, 1 and 67, all meet the $3^{rd}$ Priority, Machine 125 utilizes an additional criteria to select which lot of Product A will be selected and processed by Machine 125. By way of example and not limitation, one such criteria can be that the lot of A which first entered and is in the queue of Machine 125 to be processed by Machine 125 and travel on to Machine 29, 1 or 67 is selected over other lots of Product A which also entered and are in the queue of Machine 125 to be processed by Machine 125 and travel to Machine 29, 1 or 67 (First-In-First-out, FIFO).

EXAMPLE 8

In this Example, "N Step Ahead MIVP" is utilized to facilitate the processing of lots of Products A and B on a factory floor in accordance with the process flows set forth in Table I in Examples 1 and Table II in Example 2. Each lot of Product A or Product B visits, or "re-enters", several machines more than once.

In this Example, the decisions made by Machine 125 are detailed. As would be appreciated by those of skill in the art, the same decision-making process can be utilized by each of the other machines utilized to process Product A and Product B.

Assumptions:

N-Step Ahead MIVP is utilized.

N can be from two to ten. For this example, it is assumed N=2.

A "queue" for a machine, say Machine 125 (See Table I in Example 1 and Table II in Example 2), includes lots of Product A which have finished processing by a preceding machine or production flow step and are ready to be processed by Machine 125.

The "present queue size" is the size of a queue for a machine or production process step at the time a machine, say Machine 125, is ready to receive and process another lot of Product A or Product B.

The "historical queue size" for each machine or production process step is the average queue size over a selected period of time prior to the present instant or point in time. The selected period of time can be a day, a week, a month, etc.

The N process steps include the next process steps immediately after the process step in which a machine, for example Machine 125, bis utilized.

Two products, Products A and B, are being processed.

A "lot" of Product A comprises one or more of Product A in a boat or other container used to transport Product A.

A "lot" of Product B comprises one or more of Product B in a boat or other container used to transport Product B.

At each production flow step at least one machine normally is used to process Product A or Product B.

Machine 125 is an expensive, critical piece of machinery, which is used extensively and requires constant maintenance.

The objective is to determine which "lot" of Product A or Product B will next be processed by Machine 125.

When Machine 125 is available for processing in Step 4, 25, or 27 the following "lots" of Product A are ready for processing by Machine 125 (See Table I):
  A lot which has just been processed in Step 3 and is ready for Step 4.
  A lot which has just been processed in Step 24 and is ready for Step 25.
  A lot which has just been processed in Step 26 and is ready for Step 27.
  See Table I.

When Machine 125 is available for processing in Step 6, 25, or 27 the following "lots" of Product B are ready for processing by Machine 125 (See Table II)
  A lot which has just been processed in Step 5 and is ready for Step 6.
  A lot which has just been processed in Step 24 and is ready for Step 25.
  A lot which has just been processed in Step 26 and is ready for Step 27.
  See Table II.

The following rules determine which lot of Product A or Product B will be selected by Machine 125 at each instant in time when Machine 125 is next ready to accept a lot of Product A or Product B for processing:
  First priority (I) is where (a) the present queue size of Machine 125 is above its historical average (i.e., the present queue size of Machine 125 is greater than its historical average) and (b) the present average of the queues for the N machines or process steps (N=2 in this example, so it is the present average of the queues for the two succeeding processing machines or process steps) used to process
    (a) a lot of Product A immediately after Step 4, 25, 27, (per the process of Table I), or
    (b) a lot of Product B immediately after Step 6, 25, 27, (per the process of Table II)
    as the case may be, is below its historical average (i.e., the present average queue size for the two process steps following processing by Machine 125 is less than the historical average queue size of the two process steps). The historical average queue size is determined by adding together the historical average queue size of each of the N machines or process steps and by dividing the resulting sum by N. For example, if a machine 74 has a historical average queue size consisting of eight (8) lots of Product A and/or B and the next succeeding machine 60 has a historical average queue size of four (4) lots of Product A and/or B, then the historical average queue size of the two machines 60, 74 together equals (8+4)/2=6 lots of Product A. The present average queue size is determined by adding together the present queue size of each of N machines or process steps and by dividing the resulting sum by N. For example, if a machine 74 has a present queue size consisting of four (4) lots of Product A and/or Product B, and the next succeeding machine 60 has a present queue size of six (6) lots of Products A and/or B, then the average present queue size equals (4+6)/2=5 lots.

In Table I, Machines 29, 30, 1, 125, 67, 73 are used in the process step pairs 5–6, 26–27, and 28–29 that immediately follow the use of Machine 125 in Steps 4, 25, 27.

In Table II, Machines 73, 74, 19, 125, 73, 74, are used in process step pairs 7–8, 26–27, 28–29 that immediately follow the use of Machine 125 in Steps 6, 25, 27.

Second priority (II) is where (a) the present queue size of Machine 125 is above its historical average and (b) the present average queue size for the N Machines used in the process step following the use of Machine 125 is also above the historical average queue size for the N Machines.

Third priority (III) is where (a) the present queue size of Machine 125 is below its historical average and (b) the present average queue size of the N Machines used in the process steps following the use of Machine 125 is also below the historical average queue size for the N Machines.

Fourth priority (IV) is where (a) the present queue size of Machine 125 is below its historical average and (b) the present queue size of the N Machine used in the process steps following the use of Machine 125 is, in contrast, above the historical average queue size for the N Machines.

Each time Machine 125 becomes available, at that instant the present queue size of Machine 125 for each step (i.e., Steps 4, 25, 27 in Table I and Steps 6, 25, 27 in Table II) in which a finished lot of Product A or Product B has arrived from a preceding process step (i.e., Steps 3, 24, 26, respectively, in Table I and Steps 5, 24, 26 in Table II) is reviewed according to the priorities set forth above, i.e. in each instance where a lot of Product A or Product B has finished processing at another machine or production process step preceding Machine 125 and is now in the present queue of Machine 125 and ready to be processed by Machine 125, Machine 125

(a) compares its own present queue size to its historical average queue size;

(b) compares the present average queue size and historical average queue size of the N Machines to be used in the succeeding process steps for that lot of Product A or Product B; and, (c) assigns a priority to that lot of Product A or Product B based on whether the present queue sizes of Machine 125 and of the N Machines following Machine 125 are greater or less than the historical queue sizes of the same.

If a First Priority (I) Product A or Product B lot is available, it is chosen by Machine 125 for processing. If two or more First Priority (I) Product A and/or Product B lots are available, only one of the lots is chosen based on selected criteria. By way of example, and not limitation, one such criteria used to determine which First Priority (I) lot is chosen can be that the Product A or Product B lot which first entered the queue (i.e., entered the Machine 125 queue before the other Product A lot or lots) is selected by Machine 125 for processing (First-In-First-Out, FIFO). Another such criteria might be that the Product A or Product B lot selected by Machine 125 is the one, which has the earliest due date for shipping to customer (Due-Date-First, DDF).

If a First Priority (I) Product A or Product B lot is not available, and a Second Priority (II) Product A or Product B lot is available, then the Second Priority (II) lot is chosen. If two or more Second Priority (II) lots are available, only one of the lots is chosen for processing by Machine 125 based on selected criteria.

If neither a First (I) or Second Priority (II) Product A or Product B lot is available, and a Third Priority (III) Product A or Product A lot is available, then the Third Priority (III) lot is chosen. If two or more Third Priority (III) lots are available, only one of the lots is chosen for processing by Machine 125 based on elected criteria.

If a First (I), Second (II), or Third Priority (III) Product A or Product B lot is not available, then a Fourth Priority (IV) Product A or Product B lot is chosen. If two or more Fourth (IV) Priority lots are available, only one of the lots is chosen for processing by Machine 125 based on selected criteria.

Tables XIII and XIV below illustrate (1) the actual and historical queue size of Machines 125, 29, 30, 1, 67, 73, 74, 19 at 9:20 a.m. when Machine 125 has finished processing a lot of Product A or Product B and is ready to select another lot for processing, and (2) the historical average queue sizes and present average queue sizes for machine pairs (since N=2).

TABLE XIII

HISTORICAL AVERAGE QUEUE SIZE AND ACTUAL QUEUE SIZE AT 9:20 A.M. FOR SELECTED MACHINES USED IN PRODUCTION OF PRODUCT A and PRODUCT B

| Machine | Historical Average Queue Size (Lots or Boats in Product A or B) | Actual Queue Size at 9:20 A.M. (Lots or Boats) |
| --- | --- | --- |
| 125 | 4 | 5.0 |
| 29 | 3.5 | 2.0 |
| 30 | 3 | 1.0 |
| 1 | 4 | 5.0 |
| 67 | 4 | 1.0 |
| 73 | 2.5 | 7.0 |
| 74 | 4.5 | 3.0 |
| 19 | 5 | 6.0 |

At 9:20 a.m., the five (5) lots in the queue of Machine 125 include one lot of Product A that arrived from Step 3 (Machine 12) in Table I, one lot of Product A that arrived from Step 24 (Machine 22) in Table I, one lot of Product B that arrived from Step 5 (Machine 19) in Table II, one lot of Product B that arrived from Step 24 (Machine 22) in Table II, and one lot of Product B that arrived from Step 26 (Machine 19) in Table II.

TABLE XIV

HISTORICAL AVERAGE QUEUE SIZE AND PRESENT AVERAGE QUEUE SIZE AT 9:20 A.M. FOR SELECTED N (N = 2) MACHINE PAIRS USED IN PRODUCTION OF PRODUCT A AND PRODUCT B PER TABLES I AND II

| N Machine Pair | Historical Average Queue Size | Present Average Queue Size |
| --- | --- | --- |
| 29 (Step 5) & 30 (Step 6) | (3.5 + 3)/2 = 3.25 | (2.0 + 1.0)/2 = 1.5 |

TABLE XIV-continued

HISTORICAL AVERAGE QUEUE SIZE AND
PRESENT AVERAGE QUEUE SIZE AT 9:20 A.M.
FOR SELECTED N (N = 2) MACHINE
PAIRS USED IN PRODUCTION OF PRODUCT A
AND PRODUCT B PER TABLES I AND II

| N Machine Pair | Historical Average Queue Size | Present Average Queue Size |
|---|---|---|
| (Table I) 1 (Step 26) & 125 (Step 27) (Table I) | (4 + 4)/2 = 4 | (5.0 + 5.0)/2 = 5.0 |
| 67 (Step 28) & 73 (Step 28) (Table I) | (4 + 2.5)/2 = 3.25 | (1.0 + 7.0)/2 = 4.0 |
| 73 (Step 7) & 74 (Step 8) (Table II) | (2.5 + 4.5)/2 = 3.5 | (7.0 + 3.0)/2 = 5.0 |
| 19 (Step 26) & 125 (Step 27) (Table II) | (4 + 4)/2 = 4 | (6.0 + 5.0)/2 = 5.5 |
| 73 (Step 28) & 74 (Step 29) (Table II) | (2.5 + 4.5)/2 = 3.5 | (7.0 + 3.0)/2 = 5.0 |

The actual queue size and present average queue size for each machine or N Machines, as the case may be, on the factory floor at 9:20 a.m. can, when the system and apparatus of the invention is utilized, be determined for each machine or N machines on the factory floor. As would be appreciated by those of skill in the art, for purposes of this Example only the machines listed in Tables XIII and XIV are necessary.

If N=3, then the queues for the three machines subsequent to Machine 125 would be averaged in Table X; if N=4, then the queues for the four machines subsequent to Machine 125 would be averaged; etc. Since in this Example 7N=2, only the queues of the two machines subsequent to Machine 125 are averaged.

Since at 9:20 a.m. the actual queue size (5 lots—See Table XIII) of Machine 125 is greater than the historical average queue size (4.0 lots—See Table XIII) of Machine 125 and since the present average size (1.5 lots—See Table XIV) of the queues of Machines 29 and 30 is below the historical average queue size (3.25 lots—See Table XIII) of Machines 29 and 30, the lot of Product A which is ready at 9:20 a.m. to be processed by Machine 125 in Step 4 (Table I) and to travel on to Machines 29 and 30 in Steps 5 and 6 (Table I) meets the $1^{st}$ Priority criteria set forth above.

Since at 9:20 a.m. the actual queue size (5 lots—See Table XIII) of Machine 125 is above the historical average queue size (4.0 lots—See Table XIII) of Machine 125 and since the present average size (5.0 lots—See Table XIV) of the queues of Machines 1 and 125 is above the historical average queue size (4.00 lots—See Table XIV) of Machines 1 and 125, the lot of Product A which is ready at 9:20 a.m. to be processed by Machine 125 in Step 25 (Table I) and to travel on to Machines 1 and 125 in Steps 26 and 27 (Table I) meets the 2 Priority criteria set forth above.

Since at 9:20 a.m. the actual queue size (5 lots—See Table XIII) of Machine 125 is above the historical average queue size (4.0 lots—See Table XIII) of Machine 125 and since the present average size (4.0 lots—See Table XIV) of the queues of Machines 67 and 73 is above the historical average queue size (3.25 lots—See Table XIV) of Machines 1 and 125, the lot of Product A which is ready at 9:20 a.m. to be processed by Machine 125 in Step 28 (Table I) and to travel on to Machines 67 and 73 in Steps 28 and 29 (Table I) meets the $2^{nd}$ Priority criteria set forth above.

Since at 9:20 a.m. the actual queue size (5 lots—See Table XIII) of Machine 125 is above the historical average queue size (4.0 lots—See Table XIII) of Machine 125 and the present average size (5.0 lots—See Table XIV) of the queues of Machines 73 and 74 is greater than the historical average queue size (3.5 lots—See Table XIV) of Machines 73 and 74, the lot of Product B which is ready at 9:20 a.m. to be processed by Machine 125 in Step 6 and to travel on to Machines 73 and 74 in Steps 7 and 8 of Table II meets the 2nd Priority criteria set forth above.

Since at 9:20 a.m. the actual queue size (5 lots—See Table XIII) of Machine 125 is above the historical average queue size (4.0 lots—See Table XIII) of Machine 125 and the present average size (5.5 lots—See Table XIV) of the queues of Machines 19 and 125 is greater than the historical average queue size (4.0 lots—See Table XIV) of Machines 15 and 125, the lot of Product B which is ready at 9:20 a.m. to be processed by Machine 125 in Step 25 and to travel on to Machines 19 and 125 in Steps 26 and 27 (Table II) meets the 2nd Priority criteria set forth above.

Since at 9:20 a.m. the actual queue size (5 lots—See Table XIII) of Machine 125 is above the historical average queue size (4.0 lots—See Table XII) of Machine 125 and the present average size (5.0 lots—See Table XIV) of the queues of Machines 73 and 74 is above than the historical average queue size (3.5 lots—See Table XIV) of Machines 73 and 74, the lot of Product B which is ready at 9:20 a.m. to be processed by Machine 125 in Step 27 and to travel on to Machines 73 and 74 in Steps 28 and 29 (Table II) meets the $2^{nd}$ Priority criteria set forth above.

At 9:20 a.m., none of the lots of Product A or Product B in the queue of machine 125 meet the $3^{rd}$ Priority or 4th Priority criteria.

Since the lot of Product A ready to travel from Machine 125 to Machines 29, 30 (Steps 5 and 6 in Table I) meet the $1^{st}$ Priority criteria, Machine 125, Machine 125 selects Product A for processing at Step 4 to proceed to Step 6 Machine 29 after being processed.

EXAMPLE 9

One Product

Each Lot is in a Boat With a Computer "Book"
Each Processing Machine includes a Controller which Communicates with the "Book"
Assumptions:
  Only a single product, Product A, is being processed through a series of process steps.
  A "lot" of Product A comprises one or more of Product A in a boat used to transport Product A. A "book" is included in each boat and comprises a smart card or other device which includes a computer. The computer includes a radio frequency (RF) send/receive transmitter or includes other means for sending and receiving data.
  Machines 1 and 2 are used to process Product A contained in each boat.
  Each book includes the directions necessary to process Product A at Machines 1 and 2. After Product A is processed at a Machine 1 or 2, the book records that the processing by Machine 1 or 2 has been completed.

Each Machine 1 and 2 includes a controller (computer RF reader) which communicates with the book in a boat. When a boat arrives at a Machine 1 or 2, the controller interrogates the book to determine whether the preceding process step has been completed.

Each Machine includes a human operator or a mechanical Robot, here-in-after referred to as the operator.

Discussion

Scenario #1

A boat of Product A arrives at Machine 2. The Machine 2 controller interrogates the book in the boat. The book indicates that the next process step was to be performed by Machine 1 and has not yet been performed. The Machine 2 controller tells the operator to send the boat back to Machine 1.

Scenario #2

A boat of Product A arrives at Machine 2. The Machine 2 controller interrogates the book in the boat. The book indicates that the last process step was performed by Machine 1 and that the next process step is to be performed by Machine 2. The Machine 2 controller asks the book for instructions. The book tells the Machine 2 controller to process Product A:

(1) In a formic acid bath.

(2) At a temperature of 60 degrees C.

(3) For three minutes.

The controller gives these instructions to the machine operator. The operator selects or causes Machine 2 to prepare a 60 degree C. formic acid bath and immerses Product A in the bath for three minutes. After Product A is so processed, the Machine 2 controller informs the book. The book notes in its memory the start time and completion time and that Machine 2 completed its processing. The book can also, if desired, (1) erase from its memory the processing information for Machine 2, and (2) inform the controller of the next process step or machine which Product A must complete. The controller informs the machine operator of the next process step or machine. The machine operator directs the boat to the next such process step or machine.

Scenario #3

After visiting Machine 2, the boat carrying Product A is supposed to travel to Machine 3. Machine 3 breaks down before the boat gets to Machine 2. Machine 3 transmits a signal to the book and/or the controller of Machine 2 that Machine 3 is broken. Machine 2 utilizes the fact that Machine 3 is broken to prioritize (using MIVP or any other desired method) which boats in the queue of Machine 2 will be processed next.

Scenario #4

The same as Scenario #3, except that after visiting Machine 2, the boat carrying Product A can travel to Machine 3 or Machine 4. Machine 4 is not broken. When the boat arrives at Machine 2, the Machine 2 knows (or determines from data in the book) that Machine 3 is broken and that Machine 4 is working. The controller directs the operator of Machine 2 to process the boat at Machine 2 and to then send it to Machine 4.

EXAMPLE 10

In this Example, "N Step Ahead MIVP" is utilized to facilitate the processing of lots of Products A and B on a factory floor in accordance with the process flows set forth in Table I in Examples 1 and Table II in Example 2. Each lot of Product A or Product B visits, or "re-enters", several machines more than once.

In this Example, the decisions made by Machine 125 are detailed. As would be appreciated by those of skill in the art, the same decision-making process can be utilized by each of the other machines utilized to process Product A and Product B.

Assumptions:

N-Step Ahead MIVP is utilized.

N can be from two to ten. For this example, it is assumed N=2.

A "queue" for a machine, say Machine 125 (See Table I in Example 1), includes lots of Product A which have finished processing by a preceding machine or production flow step and are ready to be processed by Machine 125.

The "present queue size" is the size of a queue for a machine or production process step at the time a machine, say Machine 125, is ready to receive and process another lot of Product A or Product B.

The "historical queue size" for each machine or production process step is the average queue size over a selected period of time prior to the present instant or point in time. The selected period of time can be a day, a week, a month, etc.

The N process steps include the next process steps immediately after the process step in which a machine, for example Machine 125, is utilized.

Two products, Products A and B, are being processed.

A "lot" of Product A comprises one or more of Product A in a boat of other container used to transport Product A. A "book" is included in each boat and comprises a smart card or other device which includes a computer. The computer includes a radio frequency (RF) send/receive transmitter or includes other means for sending and receiving data. The book also includes for Product A the process flow information set forth in Table I in Example 1. Further, the book also includes a break down of the cycle time for each Step 1, 2, 3, 4 . . . n set forth in Example 1. The cycle time for each Step 1, 2, 3, 4, . . . n includes the time T1 required to set up the machine, the time T2 required to load a boat into the machine, the time T3 required to process the wafers (or other devices or articles) in the boat after the boat is loaded in the machine, and, the time T4 required to unload the boat from the machine after each wafer has been processed by the machine and returned to the boat. Adding together times T1, T2, T3, and T4 (T1+T2+T3+T4) for a step produces the cycle time for that step.

A "lot" of Product B comprises one or more of Product B in a boat of other container used to transport Product B. A "book" is included in each boat and comprises a smart card or other device which includes a computer. The computer includes a radio frequency (RF) send/receive transmitter or includes other means for sending and receiving data. The book also includes for Product B the process flow information set forth in Table II in Example 2. Further, the book also includes a break down of the cycle time for each Step 1, 2, 3, 4 . . . n set forth in Example 2. The cycle time for each Step 1, 2, 3, 4, . . . n includes the time T1 required to set up the machine, the time T2 required to load a boat into the machine, the time T3 required to process the wafers (or other devices or articles) in the boat after the boat is loaded in the machine, and, the time T4 required to unload the boat from the machine after each wafer has been processed by the machine and returned to the boat. Adding together times T1, T2, T3, and T4 for a step produces the cycle time for that step.

Each book also includes any additional directions necessary to process Product A or Product B, as the case may be, at a particular machine.

Each machine includes a controller (computer+RF reader) which communicates with the book in a boat. When a boat arrives at a machine, the controller associated with that machine interrogates the book in the boat to determine whether the preceding process steps set forth in Table I or Table II, as the case may be, have each been completed.

Each machine includes a human operator or a mechanical robot, hereinafter referred to as the operator.

At each production flow step at least one machine normally is used to process Product A or Product B.

Machine 125 is an expensive, critical piece of machinery, which is used extensively and requires constant maintenance.

The objective is to determine which "lot" of Product A or Product B will next be processed by Machine 125.

When Machine 125 is available for processing in Step 4, 25, or 27 the following "lots" of Product A are ready for processing by Machine 125 (See Table II):
  A lot which has just been processed in Step 3 and is ready for Step 4.
  A lot which has just been processed in Step 24 and is ready for Step 25.
  A lot which has just been processed in Step 26 and is ready for Step 27.
  See Table I.

When Machine 125 is available for processing in Step 6, 25, or 27 the following "lots" of Product B are ready for processing by Machine 125 (See Table II):
  A lot which has just been processed in Step 5 and is ready for Step 6.
  A lot which has just been processed in Step 24 and is ready for Step 25.
  A lot which has just been processed in Step 26 and is ready for Step 27.
  See Table II.

The following rules determine which lot of Product A or Product B will be selected by Machine 125 at each instant in time when Machine 125 is next ready to accept a lot of Product A or Product B for processing:
  First priority (I) is where (a) the present queue size of Machine 125 is above its historical average (i.e., the present queue size of Machine 125 is greater than its historical average) and (b) the present average of the queues for the N machines or process steps (N=2 in this example, so it is the present average of the queues for the two succeeding processing machines or process steps) used to process
    a lot of Product A immediately after Step 4, 25, 27, (per the process of Table I), or
    a lot of Product B immediately after Step 6, 25, 27, (per the process of Table II)
  as the case may be, is below its historical average (i.e., the present average queue size for the two process steps following processing by Machine 125 is less than the historical average queue size of the two process steps). The historical average queue size is determined by adding together the historical average queue size of each of the N machines or process steps and by dividing the resulting sum by N. For example, if a machine 74 has a historical average queue size consisting of eight (8) lots of Product A and/or B and the next succeeding machine 60 has a historical average queue size of four (4) lots of Product A and/or B, then the historical average queue size of the two machines 60, 74 together equals (8+4)/2=6 lots of Product A. The present average queue size is determined by adding together the present queue size of each of N machines or process steps and by dividing the resulting sum by N. For example, if a machine 74 has a present queue size consisting of four (4) lots of Product A and/or Product B, and the next succeeding machine 60 has a present queue size of six (6) lots of Products A and/or B, then the average present queue size equals (4+6)/2=5 lots.

In Table I, Machines 29, 30, 1, 125, 67, 73 are used in the process step pairs 5–6, 26–27, and 28–29 that immediately follow the use of Machine 125 in Steps 4, 25, 27.

In Table II, Machines 73, 74, 19, 125, 73, 74, are used in process step pairs 7–8, 26–27, 28–29 that immediately follow the use of Machine 125 in Steps 6, 25, 27.

Second priority (II) is where (a) the present queue size of Machine 125 is above its historical average and (b) the present average queue size for the N Machines used in the process step following the use of Machine 125 is also above the historical average queue size for the N Machines.

Third priority (III) is where (a) the present queue size of Machine 125 is below its historical average and (b) the present average queue size of the N Machines used in the process steps following the use of Machine 125 is also below the historical average queue size for the N Machines.

Fourth priority (IV) is where (a) the present queue size of Machine 125 is below its historical average and (b) the present queue size of the N Machine used in the process steps following the use of Machine 125 is, in contrast, above the historical average queue size for the N Machines.

Each time Machine 125 becomes available, at that instant the present queue size of Machine 125 for each step (i.e., Steps 4, 25, 27 in Table I and Steps 6, 25, 27 in Table II) in which a finished lot of Product A or Product B has arrived from a preceding process step (i.e., Steps 3, 24, 26, respectively, in Table I and Steps 5, 24, 26 in Table II) is reviewed according to the priorities set forth above, i.e. in each instance where a lot of Product A or Product B has finished processing at another machine or production process step preceding Machine 125 and is now in the present queue of Machine 125 and ready to be processed by Machine 125, Machine 125
  (a) compares its own present queue size to its historical average queue size;
  (b) compares the present average queue size and historical average queue size of the N Machines to be used in the succeeding process steps for that lot of Product A or Product B; and,
  (c) assigns a priority to that lot of Product A or Product B based on whether the present queue sizes of Machine 125 and of the N Machines following Machine 125 are greater or less than the historical queue sizes of the same.

If a First Priority (I) Product A or Product B lot is available, it is chosen by Machine 125 for processing. If two or more First Priority (I) Product A and/or Product B lots are available, only one of the lots is chosen based on selected criteria. By way of example, and not limitation, one such criteria used to determine which First Priority (I) lot is chosen can be that the Product A or Product B lot which first entered the queue (i.e., entered the Machine 125 queue before the other Product A lot or lots) is selected by Machine 125 for processing (First-In-First-Out, FIFO). Another such criteria might be that the Product A or Product B lot selected by Machine 125 is the one, which has the earliest due date for shipping to customer (Due-Date-First, DDF).

If a First Priority (I) Product A or Product B lot is not available, and a Second Priority (II) Product A or Product B lot is available, then the Second Priority (II) lot is chosen. If two or more Second Priority (II) lots are available, only one of the lots is chosen for processing by Machine 125 based on selected criteria.

If neither a First (I) or Second Priority (II) Product A or Product B lot is available, and a Third Priority (III) Product A or Product A lot is available, then the Third Priority (III) lot is chosen. If two or more Third Priority (III) lots are available, only one of the lots is chosen for processing by Machine 125 based on selected criteria.

If a First (I), Second (II), or Third Priority (III) Product A or Product B lot is not available, then a Fourth Priority (IV) Product A or Product B lot is chosen. If two or more Fourth (IV) Priority lots are available, only one of the lots is chosen for processing by Machine 125 based on selected criteria.

At 9:20 a.m., Machine 125 has finished processing a lot of Product A or Product B and is ready to select another lot for processing.

At 9:20 a.m. the reader for Machine 125 queries the book in each of the lots in the queue of Machine 125 to determine (1) whether each lot consists of Product A or Product B, and (2) from which step in Table I or Table II the lot has traveled to the queue of Machine 125.

At 9:20 a.m. the reader for Machine 125 determines that there are five (5) lots in the queue of Machine 125, including one lot of Product A that arrived from Step 3 (Machine 12) in Table I, one lot of Product A that arrived from Step 24 (Machine 22) in Table I, one lot of Product B that arrived from Step 5 (Machine 19) in Table II one lot of Product B that arrived from Step 24 (Machine 22) in Table II, and one lot of Product B that arrived from Step 26 (Machine 19) in Table II.

At 9:20 a.m. the reader for Machine 125 queries each of Machines 29, 30, 1, 125, 19, 125, 73, 74 to determine the present queue size for each machine and the historical average queue size for each machine. Machine 125 also queries its own memory to determine its present queue size and the historical average queue size for Machine 125. The reader receives from Machines 29, 30, 1, 125, 19, 125, 73, 74 the data set forth below in Table XV. The reader calculates the values set forth below in

TABLE XV

HISTORICAL AVERAGE QUEUE SIZE AND ACTUAL QUEUE SIZE AT 9:20 A.M. FOR SELECTED MACHINES USED IN PRODUCTION OF PRODUCT A and PRODUCT B

| Machine | Historical Average Queue Size (Lots or Boats in Product A or B) | Actual Queue Size at 9:20 A.M. (Lots or Boats) |
|---|---|---|
| 125 | 4 | 5.0 |
| 29 | 3.5 | 2.0 |
| 30 | 3 | 1.0 |
| 1 | 4 | 5.0 |
| 73 | 2.5 | 7.0 |
| 74 | 4.5 | 3.0 |
| 19 | 5 | 6.0 |

TABLE XVI

HISTORICAL AVERAGE QUEUE SIZE AND PRESENT AVERAGE QUEUE SIZE AT 9:20 A.M. FOR SELECTED N (N = 2) MACHINE PAIRS USED IN PRODUCTION OF PRODUCT A AND PRODUCT B PER TABLES I AND II

| N Machine Pair | Historical Average Queue Size | Present Average Queue Size |
|---|---|---|
| 29 (Step 5) & 30 (Step 6) (Table I) | (3.5 + 3)/2 = 3.25 | (2.0 + 1.0)/2 = 1.5 |
| 1 (Step 26) & 125 (Step 27) (Table I) | (4 + 4)/2 = 4 | (5.0 + 5.0)/2 = 5.0 |
| 73 (Step 7) & 74 (Step 8) (Table II) | (2.5 + 4.5)/2 = 3.5 | (7.0 + 3.0)/2 = 5.0 |
| 19 (Step 26) & 125 (Step 27) (Table II) | (4 + 4)/2 = 4 | (6.0 + 5.0)/2 = 5.5 |

The actual queue size and present average queue size for each machine or N Machines, as the case may be, on the factory floor at 9:20 a.m. can, when the system and apparatus of the invention is utilized, be determined by the reader for machine 125 each machine or N machines on the factory floor. As would be appreciated by those of skill in the art, for purposes of this Example only the machines listed in Tables XV and XVI are necessary.

If N=3, then the queues for the three machines subsequent to Machine 125 would be averaged in Table X; if N=4, then the queues for the four machines subsequent to Machine 125 would be averaged; etc. Since in this Example 10N=2, only the queues of the two machines subsequent to Machine 125 are averaged.

Since at 9:20 a.m. the actual queue size (5 lots—See Table XV) of Machine 125 is greater than the historical average queue size (4.0 lots—See Table XV) of Machine 125 and since the present average size (1.5 lots—See Table XVI) of the queues of Machines 29 and 30 is below the historical average queue size (3.25 lots—See Table XV) of Machines 29 and 30, the lot of Product A which is ready at 9:20 a.m. to be processed by Machine 125 in Step 4 (Table I) and to travel on to Machines 29 and 30 in Steps 5 and 6 (Table I) meets the $1^{st}$ Priority criteria set forth above.

Since at 9:20 a.m. the actual queue size (5 lots—See Table XV) of Machine 125 is above the historical average queue size (4.0 lots—See Table XV) of Machine 125 and since the present average size (5.0 lots—See Table XVI) of the queues of Machines 1 and 125 is above the historical average queue size (4.00 lots—See Table XVI) of Machines 1 and 125, the lot of Product A which is ready at 9:20 a.m. to be processed by Machine 125 in Step 25 (Table I) and to travel on to Machines 1 and 125 in Steps 26 and 27 (Table I) meets the $2^{nd}$ Priority criteria set forth above.

Since at 9:20 a.m. the actual queue size (5 lots—See Table XV) of Machine 125 is above the historical average queue size (4.0 lots—See Table XV) of Machine 125 and the present average size (5.0 lots—See Table XVI) of the queues of Machines 73 and 74 is greater than the historical average queue size (3.5 lots—See Table XVI) of Machines 73 and 74, the lot of Product B which is ready at 9:20 a.m. to be processed by Machine 125 in Step 6 and to travel on to Machines 73 and 74 in Steps 7 and 8 of Table II meets the 2nd Priority criteria set forth above.

Since at 9:20 a.m. the actual queue size (5 lots—See Table XV) of Machine 125 is above the historical average queue size (4.0 lots—See Table XV) of Machine 125 and the present average size (5.5 lots—See Table XVI) of the queues of Machines 19 and 125 is greater than the historical average queue size (4.0 lots—See Table XVI) of Machines 15 and 125, the lot of Product B which is ready at 9:20 a.m. to be processed by Machine 125 in Step 25 and to travel on to Machines 19 and 125 in Steps 26 and 27 (Table II) meets the 2nd Priority criteria set forth above.

Since at 9:20 a.m. the actual queue size (5 lots—See Table XIII) of Machine 125 is above the historical average queue size (4.0 lots—See Table XIII) of Machine 125 and the present average size (5.0 lots—See Table XIV) of the queues of Machines 73 and 74 is above than the historical average queue size (3.5 lots—See Table XIV) of Machines 73 and 74, the lot of Product B which is ready at 9:20 a.m. to be processed by Machine 125 in Step 27 and to travel on to Machines 73 and 74 in Steps 28 and 29 (Table II) meets the $2^{nd}$ Priority criteria set forth above.

At 9:20 a.m., none of the lots of Product A or Product B in the queue of machine 125 meet the 3rd Priority or 4th Priority criteria.

Since the lot of Product A ready to travel from. Machine 125 to Machines 29, 30 (Steps 5 and 6 in Table I) meets the $1^{st}$ Priority criteria, Machine 125, Machine 125 selects Product A for processing at Step 4 to proceed to Step 6 Machine 29 after being processed.

The reader for Machine 125 queries the book (i.e., smart card) included in the lot for Product A selected to be processed at Step 4 in Table I and determines for that lot of Product A the cycle time and batch size information set forth below in Table XVII.

TABLE XVII

PROJECTED CYCLE TIME AND BATCH SIZE
INFORMATION FOR LOT OF PRODUCT A IN
QUEUE OF MACHINE 125 AFTER BEING
PROCESSED IN STEP 3 IN TABLE I

| Setup Time (Seconds) | Load Time (Seconds) | Process Time (Seconds) | Unload Time (Seconds) | Batch Size (Lots) |
|---|---|---|---|---|
| 5 | 5 | 45 | 5 | 1 |

The reader for Machine 125 also reads from the smart card assigned to the boat containing Product A the product identification number assigned to the boat and queries the smart card to determine if there are special processing instructions associated with the processing of Product A. The product ID number, special processing instructions (if any), the batch size, and the setup time, load time, process time, and unload time information set forth in Table XVII above appear on the CRT or television screen used by the operator. The operator then sets up Machine 125, loads the boat into Machine 125, processes the contents of the boat, and unloads the boat from the Machine 125. Processing the contents of the boat may require that individual wafers or other components be removed from the boat, processed, and returned to the boat before the boat is unloaded or removed from the Machine 125.

After processing of the boat by Machine 125 is completed, the reader associated with Machine 125 transmits the actual cycle time information to the book on the boat. This cycle time information is stored in the book and is set forth below in Table XVIII.

TABLE XVIII

ACTUAL CYCLE TIME AND BATCH SIZE
INFORMATION FOR LOT OF PRODUCT A
IN QUEUE OF MACHINE 125 AFTER BEING
PROCESSED IN STEP 3 IN TABLE I

| Setup Time (Seconds) | Load Time (Seconds) | Process Time (Seconds) | Unload Time (Seconds) | Batch Size (Lots) |
|---|---|---|---|---|
| 4 | 6 | 42 | 5 | 1 |

The reader associated with Machine 125 also prompts the book to note that Process Step 4 has been completed.

The reader for Machine 125 then directs the boat to Machine 29 so that Step 5 in Table 1 can be completed.

Having described my invention in such terms as to enable those skilled in the art to make and practice it, and having described the presently preferred embodiments thereof, I claim:

1. In a process for processing at least one product, the process processing a plurality of lots of the product and comprising a sequence of process steps including a first process step, a queue for the process step, a plurality of lots of the product in the queue, and a machine used in the first process step to process the product, the improvements for increasing the efficiency of the process and reducing the time required for the product to complete the process, and including the computer-implemented steps of (a) determining the lots of the product in the queue of the first process step;

(b) determining for each lot in the queue of the first process step the process step which was completed immediately prior to the lots' entering the queue of the first process step;

(c) determining for each lot in the queue of the first process step
  (i) at least the next subsequent process step to be completed by the lot after the lot is processed during the first process step,
  (ii) the present queue size for the next subsequent process step,
  (iii) the historical average queue size for the next subsequent process step;

(d) determining for the first process step
  (i) the present queue size, and
  (ii) the historical average queue size;
(e) making a first determination by determining whether the present queue size for the next subsequent process step is one of a pair consisting of
  (i) greater than the historical average queue size for the next subsequent process step, and
  (ii) less than the historical average queue size for the next subsequent process step;
(f) making a second determination by determining whether the present queue size for the first process step is one of a pair consisting of
  (i) greater than the historical average queue size of the first process step, and
  (ii) less than the historical average queue size of the first process step; and,
(g) comparing for each lot the first determination with the second determination to prioritize which lot is selected for processing during the first process step.

2. In a process for processing at least one product, the process processing a plurality of lots of the product and comprising a sequence of process steps including
  a first process step,
  a queue for the process step,
  a plurality of lots of the product in the queue,
  a machine used in the first process step to process the product, and
  at least a second process step during which the machine is used to process the product,
the improvements for increasing the efficiency of the process and reducing the time required for the product to complete the process, and including the computer-implemented steps of
  (a) determining the lots of the product in the queue of the first process step;
  (b) determining for each lot in the queue of the first process step the process step which was completed immediately prior to the lots' entering the queue of the first process step;
  (c) determining for each lot in the queue of the first process step
    (i) at least the next subsequent process step to be completed by the lot after the lot is processed during the first process step,
    (ii) the present queue size for the next subsequent process step,
    (iii) the historical average queue size for the next subsequent process step;
  (d) determining for the first process step
    (i) the present queue size, and
    (ii) the historical average queue size;
  (e) making a first determination by determining whether the present queue size for the next subsequent process step is one of a pair consisting of
    (i) greater than the historical average queue size for the next subsequent process step, and
    (ii) less than the historical average queue size for the next subsequent process step;
  (f) making a second determination by determining whether the present queue size for the first process step is one of a pair consisting of
    (i) greater than the historical average queue size of the first process step, and
    (ii) less than the historical average queue size of the first process step; and,
  (g) comparing for each lot the first determination with the second determination to prioritize which lot is selected for processing during the first process step.

* * * * *